United States Patent
Anand et al.

(10) Patent No.: US 12,418,560 B1
(45) Date of Patent: *Sep. 16, 2025

(54) COMPUTER-BASED SYSTEMS CONFIGURED FOR NETWORK CHARACTERIZATION AND MANAGEMENT AND METHODS OF USE THEREOF

(71) Applicant: Virtualitics, Inc., Pasadena, CA (US)

(72) Inventors: Vaibhav Anand, Chicago, IL (US); Charles Joseph Bonfield, Raleigh, NC (US); Jae Gook Ro, Chantilly, VA (US); Brandon Lee Knight, South Lake Tahoe, CA (US); Sarthak Sahu, Pasadena, CA (US); Ciro Donalek, Pasadena, CA (US); Michael Amori, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/052,665

(22) Filed: Feb. 13, 2025

Related U.S. Application Data

(63) Continuation of application No. 18/812,503, filed on Aug. 22, 2024, now Pat. No. 12,244,636.

(60) Provisional application No. 63/649,219, filed on May 17, 2024.

(51) Int. Cl.
*H04L 9/40* (2022.01)
(52) U.S. Cl.
CPC ............................. *H04L 63/1433* (2013.01)

(58) Field of Classification Search
CPC ..................................... H04L 63/1433
See application file for complete search history.

(56) References Cited

U.S. PATENT DOCUMENTS

| | | | |
|---|---|---|---|
| 7,761,918 B2 * | 7/2010 | Gula | H04L 63/1408 709/224 |
| 9,679,137 B2 * | 6/2017 | Hanes | G06F 21/562 |
| 11,316,883 B2 * | 4/2022 | Sbandi | H04L 63/1416 |
| 11,831,670 B1 * | 11/2023 | Molls | H04L 63/1441 |
| 12,244,635 B1 * | 3/2025 | Bonfield | H04L 63/1433 |

(Continued)

FOREIGN PATENT DOCUMENTS

| | | | |
|---|---|---|---|
| CN | 115277129 A | * | 11/2022 |
| CN | 115292720 A | * | 11/2022 |

(Continued)

*Primary Examiner* — Sarah Su
(74) *Attorney, Agent, or Firm* — GREENBERG TRAURIG, LLP

(57) ABSTRACT

A method includes scanning a network having a first and second host, obtaining, via the scanning, a first and second type information of the first and second host, respectively, the first or second type information including a device category, obtaining, via the scanning, a first and second scaling factor of the first and second host, respectively, calculating, a first criticality score of the first host based on the first type information and the first scaling factor, calculating a second criticality score of the second host based on the second type information and the second scaling factor, calculating a first host risk score (HRS) for the first host based on the first criticality score, calculating a second HRS for the second host based on the second criticality score, and applying a security patch on the first host prior to the second host first HRS is higher than the second HRS.

21 Claims, 22 Drawing Sheets

(56) References Cited

U.S. PATENT DOCUMENTS

| | | | | |
|---|---|---|---|---|
| 12,244,636 B1* | 3/2025 | Anand | ................ | H04L 63/1433 |
| 2006/0272011 A1* | 11/2006 | Ide | ..................... | H04L 63/1433 |
| | | | | 726/5 |
| 2013/0191919 A1* | 7/2013 | Basavapatna | ........... | H04L 63/20 |
| | | | | 726/25 |
| 2017/0289199 A1* | 10/2017 | Barday | ............... | G06F 3/04817 |
| 2018/0144139 A1* | 5/2018 | Cheng | ................ | H04L 63/1433 |
| 2018/0183824 A1* | 6/2018 | Chen | .................. | H04L 63/1425 |
| 2019/0342322 A1* | 11/2019 | Boulton | ............... | H04W 12/66 |
| 2020/0412757 A1* | 12/2020 | Siddiq | ................ | H04L 63/1433 |
| 2021/0297439 A1* | 9/2021 | Hicks | ................. | H04L 63/1416 |
| 2021/0312400 A1* | 10/2021 | Irimie | ................ | H04L 63/1416 |
| 2021/0344713 A1* | 11/2021 | Kras | ..................... | H04L 51/046 |
| 2022/0337611 A1* | 10/2022 | Brazao | ................. | G06F 21/552 |
| 2023/0421579 A1* | 12/2023 | Thomas | ................. | H04L 63/14 |
| 2024/0179171 A1* | 5/2024 | Rowell | ............... | H04L 63/1433 |
| 2024/0179172 A1* | 5/2024 | Rowell | ............... | H04L 63/1433 |

FOREIGN PATENT DOCUMENTS

| | | | | | |
|---|---|---|---|---|---|
| CN | | 117473512 A | * | 1/2024 | |
| EP | | 3021546 A1 | * | 5/2016 | ......... H04L 63/1441 |

\* cited by examiner

Vulnerability Summary (CVE-2024-21338)
Windows Kernel Elevation of Privilege Vulnerability Vulnerability Risk Score ⓘ
84
Severity: Critical
Num. Affected Hosts: 2,500
Num. Linked Threats: 13

CVSS v3 Base Score ⚠
7.8
CNA: Microsoft Corporation
Base Vector:
CVSS:3.1/AV:L/AC:L/PR:L/
UI:N/S:U/C:H/I:H/A:H Patchable? ⌄
Yes
Publication Date:
2/13/2024

NVD Publication Date ⓘ
2/13/2024
Last Modified: 3/4/2024

ⓘ Recommended Action

Send list of affected hosts to patch management team for immediate remediation

Leaving this vulnerability (CVE-2024-21338) unpatched poses high risk to network security. Click "Send Hosts" to route the list of affected hosts to expedite patching efforts.

Send Hosts

Show less

FIG. 2

At-Risk Hosts (Location A)

| Host ID | Host IP | Host Type | Host Type Confidence | Host Risk Score | Host Criticality Score |
|---|---|---|---|---|---|
| X | 123.4.5.12 | Workstation | 98 | 89 | 64 |
| Y | 123.4.5.13 | Workstation | 94 | 74 | 72 |
| Z | 123.4.5.14 | Workstation | 73 | 53 | 87 |
| B | 123.4.5.91 | Server | 100 | 38 | 97 |

Rows per page: 10 ▾   1-10 of 150

FIG. 6

Critical Hosts

| Host ID | Host Type | Host Type Confidence | Host Criticality Score | Host Risk Score |
|---|---|---|---|---|
| A | Server | 100 | 97 | 39 |
| B | Server | 95 | 95 | 84 |
| C | Server | 100 | 94 | 96 |
| D | Workstation | 96 | 89 | 53 |
| E | Server | 92 | 87 | 85 |
| F | Workstation | 88 | 82 | 92 |
| G | Workstation | 100 | 80 | 64 |

Rows per page: 10 ▼   1-10 of 150

FIG. 18

COMPUTER-BASED SYSTEMS CONFIGURED FOR NETWORK CHARACTERIZATION AND MANAGEMENT AND METHODS OF USE THEREOF

CROSS REFERENCE TO RELATED APPLICATION

This application is a continuation of U.S. patent application Ser. No. 18/812,503, filed Aug. 22, 2024, entitled "COMPUTER-BASED SYSTEMS CONFIGURED FOR NETWORK CHARACTERIZATION AND MANAGEMENT AND METHODS OF USE THEREOF," which claims the benefit or priority to U.S. Provisional Application No. 63/649,219, filed May 17, 2024, entitled "COMPUTER-BASED SYSTEMS CONFIGURED FOR NETWORK CHARACTERIZATION AND MANAGEMENT AND METHODS OF USE THEREOF", the specification and drawings of which are incorporated herein by reference.

FIELD OF TECHNOLOGY

The present disclosure generally relates to computer network management, and more particularly to computer network characterization and management based on risk score and key terrain analysis and methods of use thereof.

BACKGROUND OF TECHNOLOGY

Typically, network security may be viewed as the process of safeguarding the underlying networking infrastructure from unauthorized access, misuse, and/or theft. Typically, network security may involve creating a secure environment for devices, applications, users, and/or data to operate safely. In some embodiments, some aspects of network security may include the use of firewalls, intrusion prevention systems (IPS), workload security, network segmentation and/or virtual private networks (VPN).

Firewalls may be network security devices that monitor incoming and outgoing traffic, deciding whether to allow and/or block specific data based on predefined security rules.

IPS may be configured to actively scan network traffic to block attacks. By correlating global threat intelligence, secure IPS appliances may not only prevent malicious activity but may also track suspect files and malware across the network to prevent further spread.

Workload security may protect workloads moving across different cloud and hybrid environments. Workload security ensures security without compromising business agility.

Software-defined network segmentation classifies network traffic based on endpoint identity (not just IP addresses). Access rights may be assigned by role, location, and other factors, ensuring the right level of access for authorized users and the containment of suspicious devices.

VPNs may encrypt connections from endpoints to networks, often over the internet, enhancing privacy and security.

SUMMARY OF DESCRIBED SUBJECT MATTER

In some aspects, the techniques described herein relate to a computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score for the first host based on the first type information and the first scaling factor, and a second criticality score for the second host based on the second type information and the second scaling factor; obtaining, by the computing device via the scanning, first risk information of each instance of vulnerability associated with the first host during a predetermined time period, and second risk information of each instance of vulnerability associated with the second host during the predetermined time period, where the first risk information includes a common vulnerability scoring system (CVSS) score, an exploitability measurement and a measurement parameter of identified link to one or more bad actors associated with the first host, and the second risk information includes a common vulnerability scoring system (CVSS) score, an exploitability measurement and a measurement parameter of identified link to one or more bad actors associated with the second host; calculating, by the computing device, a first vulnerability risk score (VRS) based at least in part on the first risk information for each instance of vulnerability associated with the first host, and a second VRS based at least in part on the second risk information for each instance of vulnerability associated with the second host; counting, by the computing device, a first and second number of vulnerabilities associated with the first and second host, respectively, during the predetermined period; calculating, by the computing device, a first host risk score (HRS) for the first host based on the first VRS, the first number of vulnerabilities and the first criticality score, and a second host risk score (HRS) for the second host based on the second VRS, the second number of vulnerabilities and the second criticality score; facilitating, by the computing device, to apply a security patch on the first host prior to the second host when the first HRS is higher than the second HRS.

In some aspects, the techniques described herein relate to a method, where the first or second device category is one of workstation, router, server, printer, camera or a combination thereof.

In some aspects, the techniques described herein relate to a method, where the first type information includes a first criticality range with a first minimum and first maximum value for the first device category, and a second type information includes a second criticality range with a second minimum and second maximum value for the second device category.

In some aspects, the techniques described herein relate to a method, where the first minimum value and the second minimum value are obtained by a machine learning model.

In some aspects, the techniques described herein relate to a method, where calculating the first criticality score includes multiplying the first type information and the first scaling factor, and calculating the second criticality score includes multiplying the second type information and the second scaling factor.

In some aspects, the techniques described herein relate to a method, where calculating the first criticality score includes using the first minimum value as a multiplication factor; and calculating the second criticality score includes using the second minimum value as a multiplication factor.

In some aspects, the techniques described herein relate to a method, where obtaining the first or second type information includes: comparing the first or second type information to type information of a plurality of hosts within the network to generate a confidence score for the first or second host; and grouping the type information of the plurality of hosts based on the confidence score meeting a predetermined threshold.

In some aspects, the techniques described herein relate to a method, where the functionality of the first or second host is identified based at least in part on a network map.

In some aspects, the techniques described herein relate to a method, where the functionality of the first or second host is inferred by network traffic and interactions.

In some aspects, the techniques described herein relate to a method, where the use case of the first or second host is determined at least in part by a location of the respective host.

In some aspects, the techniques described herein relate to a method, where calculating the first VRS includes: calculating, by the computing device, a first vulnerability measure for each instance of the vulnerability based on the associated first risk information to generate a plurality of first vulnerability measures; selecting, by the computing device, one of the plurality of first vulnerability measures to be the first VRS based on a predetermined criterion; and where calculating the second VRS includes: calculating, by the computing device, a second vulnerability measure for each instance of the vulnerability based on the associated second risk information to generate a plurality of second vulnerability measures; selecting, by the computing device, one of the second plurality of vulnerability measures to be the second VRS based on the predetermined criterion.

In some aspects, the techniques described herein relate to a method, where the first or second vulnerability measure has a linear relationship with the respective CVSS score, the respective exploitability measurement and the respective measurement parameter of identified link to one or more bad actors.

In some aspects, the techniques described herein relate to a method, where the predetermined criterion is to select the first or second VRS with a highest value.

In some aspects, the techniques described herein relate to a method, where the first HRS has a linear relationship with the first VRS, the first number of vulnerabilities and the first criticality score; and the second HRS has the linear relationship with the second VRS, the second number of vulnerabilities and the second criticality score.

In some aspects, the techniques described herein relate to a method, further including obtaining, by the computing device, network traffic information at the first and second host during the predetermined period and display the network traffic information along with the first and second HRS and the first and second criticality score.

In some aspects, the techniques described herein relate to a method, further including repeatedly scanning the network to calculate at least the first HRS for the first host.

In some aspects, the techniques described herein relate to a computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score for the first host by multiplying the first type information and the first scaling factor, and a second criticality score for the second host by multiplying the second type information and the second scaling factor; obtaining, by the computing device via the scanning, first risk information of each instance of vulnerability associated with the first host during a predetermined time period, and second risk information of each instance of vulnerability associated with the second host during the predetermined time period, where the first risk information has a linear relationship with a common vulnerability scoring system (CVSS) score, an exploitability measurement and a measurement parameter of identified link to one or more bad actors associated with the first host, and the second risk information has a linear relationship with a common vulnerability scoring system (CVSS) score, an exploitability measurement and a measurement parameter of identified link to one or more bad actors associated with the second host; calculating, by the computing device, a first vulnerability measure for each instance of the vulnerability based on the associated first risk information to generate a plurality of first vulnerability measures, and a second vulnerability measure for each instance of the vulnerability based on the associated second risk information to generate a plurality of second vulnerability measures; selecting, by the computing device, one of the plurality of first vulnerability measures to be a first vulnerability risk score (VRS) based on a predetermined criterion, and one of the plurality of second vulnerability measures to be the second VRS based on the predetermined criterion; counting, by the computing device, a first and second number of vulnerabilities associated with the first and second host, respectively, during a predetermined period; calculating, by the computing device, a first host risk score (HRS) for the first host based on the first VRS, the first number of vulnerabilities and the first criticality score, and a second host risk score (HRS) for the second host based on the second VRS, the second number of vulnerabilities and the second criticality score; and facilitating, by the computing device, to apply a security patch on the first host prior to the second host when the first HRS is higher than the second HRS.

In some aspects, the techniques described herein relate to a method, where the device category is one of workstation, router, server, printer, camera or a combination thereof, and has a criticality range with a minimum and maximum value.

In some aspects, the techniques described herein relate to a method, where calculating the first criticality score includes using, as a multiplication factor, a first minimum value for the first device category of the first type information; and calculating the second criticality score includes using, as a multiplication factor, a second minimum value for the second device category of the second type information.

In some aspects, the techniques described herein relate to a method, where the functionality of the first or second host is identified based on a network map or inferred by network traffic and interactions.

In some aspects, the techniques described herein relate to a method, where the use case of the first or second host is determined by a location of the respective host.

In some aspects, the techniques described herein relate to a method, where the first or second risk information includes a common vulnerability scoring system (CVSS) score, an exploitability measurement and a measurement parameter of identified link to one or more bad actors of the respective host.

In some aspects, the techniques described herein relate to a method, where the first or second vulnerability measure has a linear relationship with the respective CVSS score, the respective exploitability measurement and the respective measurement parameter of identified link to one or more bad actors.

In some aspects, the techniques described herein relate to a method, where the predetermined criterion is to select the first or second VRS with a highest value.

In some aspects, the techniques described herein relate to a method, where the first HRS has a linear relationship with the first VRS, the first number of vulnerabilities and the first criticality score; and the second HRS has the linear relationship with the second VRS, the second number of vulnerabilities and the second criticality score.

In some aspects, the techniques described herein relate to a method, further including obtaining, by the computing device, network traffic information at the first and second host during the predetermined period and display the network traffic information along with the first and second HRS and the first and second criticality score.

In some aspects, the techniques described herein relate to a method, further including repeatedly scanning the network to calculate at least the first HRS for the first host.

In some aspects, the techniques described herein relate to a system, including: one or more processors; and a memory in communication with the one or more processors and storing instructions that, when executed by the one of more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first scaling factor of the first host, and a second scaling factor of the second host, where the first or second scaling factor is based at least in part on: a number of services running on the respective host, a functionality of the respective host, and a use case of the respective host; calculate a first criticality score for the first host based on the first type information and the first scaling factor, and a second criticality score for the second host based on the second type information and the second scaling factor; obtain, via the scanning, first risk information of each instance of vulnerability associated with the first host during a predetermined time period, and second risk information of each instance of vulnerability associated with the second host during the predetermined time period, where the first risk information includes a common vulnerability scoring system (CVSS) score, an exploitability measurement and a measurement parameter of identified link to one or more bad actors associated with the first host, and the second risk information includes a common vulnerability scoring system (CVSS) score, an exploitability measurement and a measurement parameter of identified link to one or more bad actors associated with the second host; calculate a first vulnerability risk score (VRS) based at least in part on the first risk information for each instance of vulnerability associated with the first host, and a second VRS based at least in part on the second risk information for each instance of vulnerability associated with the second host; count a first and second number of vulnerabilities associated with the first and second host, respectively, during the predetermined period; calculate a first host risk score (HRS) for the first host based on the first VRS, the first number of vulnerabilities and the first criticality score, and a second host risk score (HRS) for the second host based on the second VRS, the second number of vulnerabilities and the second criticality score; facilitate to apply a security patch on the first host prior to the second host when the first HRS is higher than the second HRS.

In some aspects, the techniques described herein relate to a system, including: one or more processors; and a memory in communication with the one or more processors and storing instructions that, when executed by the one of more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first scaling factor of the first host, and a second scaling factor of the second host, where the first or second scaling factor is based at least in part on: a number of services running on the respective host, a functionality of the respective host, and a use case of the respective host; calculate a first criticality score for the first host by multiplying the first type information and the first scaling factor, and a second criticality score for the second host by multiplying the second type information and the second scaling factor; obtain, via the scanning, first risk information of each instance of vulnerability associated with the first host during a predetermined time period, and second risk information of each instance of vulnerability associated with the second host during the predetermined time period, where the first risk information has a linear relationship with a common vulnerability scoring system (CVSS) score, an exploitability measurement and a measurement parameter of identified link to one or more bad actors associated with the first host, and the second risk information has a linear relationship with a common vulnerability scoring system (CVSS) score, an exploitability measurement and a measurement parameter of identified link to one or more bad actors associated with the second host; calculate a first vulnerability measure for each instance of the vulnerability based on the associated first risk information to generate a plurality of first vulnerability measures, and a second vulnerability measure for each instance of the vulnerability based on the associated second risk information to generate a plurality of second vulnerability measures; select one of the plurality of first vulnerability measures to be a first vulnerability risk score (VRS) based on a predetermined criterion, and one of the plurality of second vulnerability measures to be the second VRS based on the predetermined criterion; count a first and second number of vulnerabilities associated with the first and second host, respectively, during a predetermined period; calculate a first host risk score (HRS) for the first host based on the first VRS, the first number of vulnerabilities and the first criticality score, and a second host risk score (HRS) for the second host based on the second VRS, the second number of vulnerabilities and the second criticality score; and facilitate to apply a security patch on the first host prior to the second host when the first HRS is higher than the second HRS.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 shows a dashboard displaying vulnerability risk score and descriptive data from publicly available data sources.

FIG. 6 shows a dashboard with a table displaying other host-related information, such as host type, host type confidence, host risk score and host criticality score, that the presently disclosed network characterization and management system may utilize to prioritize patch management and/or proactively improve cyber defense posture.

FIG. 18 shows a table displaying various host type related information, such as host type confidence, host criticality score and host risk score, that the presently disclosed network characterization and management system may utilize to prioritize patch management and/or proactively improve cyber defense posture.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure describes various aspects of various embodiments of network characterization and management systems based on risk score analysis.

Figure 1:
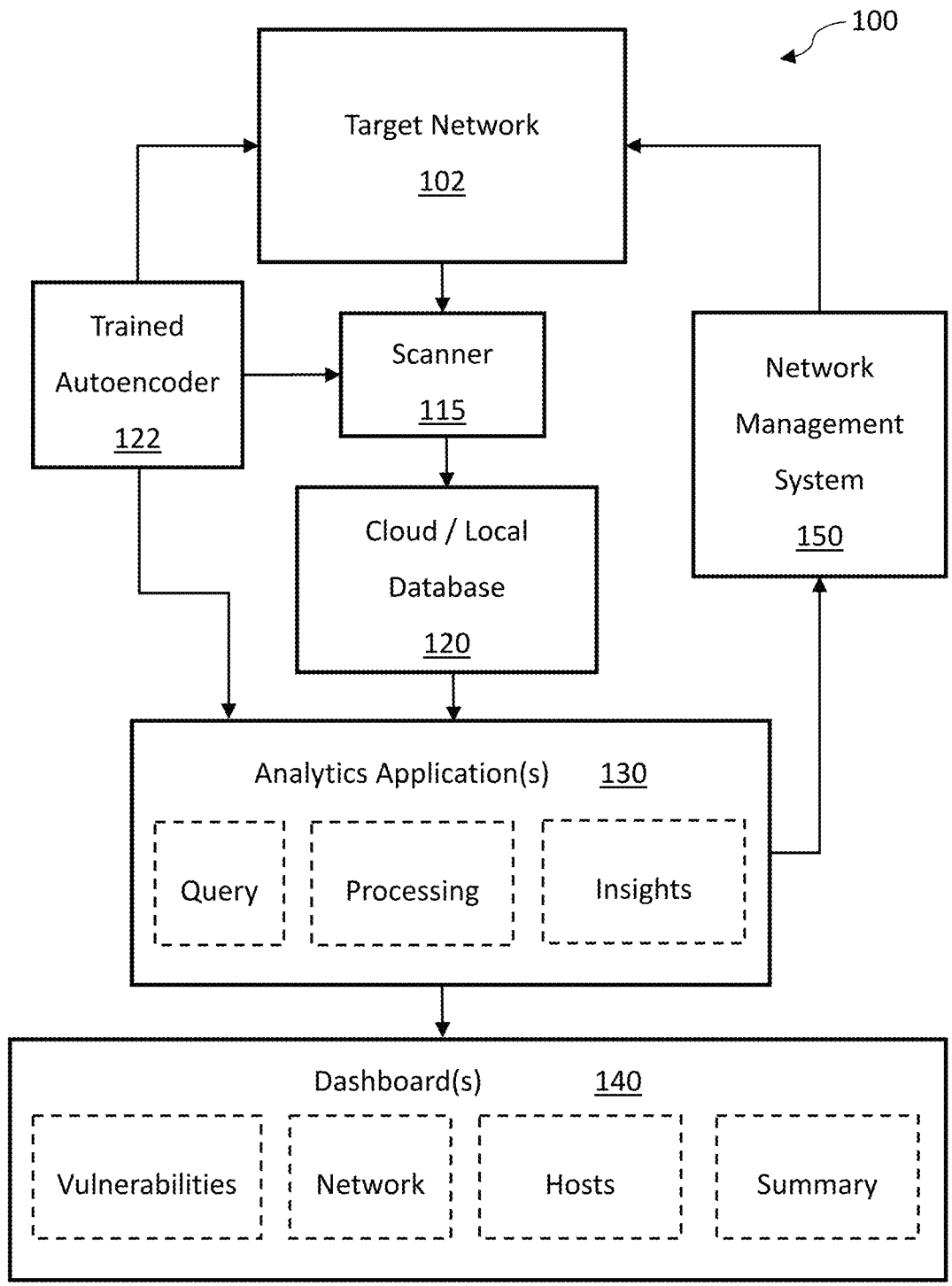
FIG. 1 is a block diagram of an exemplary network characterization and management system for securing a computer network in accordance with one or more embodiments of the present disclosure.

FIG. 1 is a block diagram of an exemplary network characterization and management system 100 for securing a computer network in accordance with one or more embodiments of the present disclosure. The network characterization and management system 100 includes at least one scanner 115, at least one cloud and/or local database 120, at least one analytics application 130, at least one dashboard 140, a network management system 150 for securing a target network 102 and a trained autoencoder 122.

In some embodiments, the scanner 115 runs on the target network 102 from a scanner host to explore and gather information about devices on the target network 102. For example, the scanner 115 scans the target network 102 and identifies media access control (MAC) addresses associated with all the devices connected therein. The scanner 115 can also identify active Internet protocol (IP) addresses within a given range or subnet and determine availability of hosts or devices on the target network 102. Scans may include, but are not limited to, host discovery and vulnerability scans.

The term "host," as used herein, refers generally to any device on the network and may include but is not limited to workstations, routers, servers, printers, or cameras. If a device interacts with other network components and/or performs at least one network operation, the device qualifies as a host.

In some embodiments, the scan results may be pushed to database 120 for retrieval. The database 120 may be cloud-based, local to the scanner 115, or both. By pushing the scan results to the database 120, the network characterization and management system 100 can assess and monitor network vulnerabilities, maintain an asset inventory, detect changes in the target network 102, and centralize reporting and analysis.

For vulnerability assessment and monitoring, pushing scan results to the database 120 allows organizations to maintain a historical record of security assessments. This enables organizations to track changes over time, compare results, and ensure compliance with security policies.

For asset inventory and tracking, network scans reveal information about devices, services, and software running on the target network 102. Pushing this data to the database 120 allows organizations to create an inventory of network assets. Pushing data to the database 120 helps answer questions like: "What devices are connected?", "Which software versions are in use?", and "Are there unauthorized or unpatched systems?".

Regular network scans enables change detection for the network environment. By storing scan results in the database 120, organizations can track modifications such as: new devices added; software installations or updates; and configuration changes. Such regular network scans aid in incident response and forensics.

For centralized reporting and analysis, the database 120 provides a centralized repository for scan results. Security teams can generate reports, visualize trends, and analyze patterns. Such centralized reporting and analysis facilitate decision-making, risk assessment, and resource allocation.

In general, pushing scan results to the database 120 may be like having a well-organized library of network insights.

In some embodiments, the analytics applications 130 query the database 120 to retrieve scan results, process scan results, and present insights derived from data to end users. The analytics applications 130 collect, process and analyze network data to improve various aspects of the network. The present disclosure describes a system and method to automate analytics applications, thus eliminating the need for manual troubleshooting and complex tasks performed by information technology (IT) staff members.

In some embodiments, the scanner 115 may transmit vulnerability assessment scan results to the database 120, where a user can maintain a historical record of security assessments and the historical data that includes historical unique identification codes for the plurality of devices and historical features. In certain embodiments, this historical data may be utilized to train an encoder 122. The trained encoder 122 may refer to a machine learning model and/or a plurality of logic trees capable of generating a plurality of unique identification codes for the plurality of devices, comparing the plurality of unique identification codes, and calculating a similarity score based on the comparison of the plurality of unique identification codes. In some embodiments, the trained encoder 122 may track changes over time, compare results, and ensure compliance with security policies.

In some embodiments, the trained encoder 122 may generate the plurality of unique identification codes for the plurality of devices identified by the scanner 115 within the target network 102. In some embodiments, the output of the scanner 115 (e.g., network scans) may reveal information about the plurality of devices running on the target network 102, where the network scans may provide information related to each device and any software being performed by each device. In some embodiments, the network system 100 may generate an inventory of network assets in response to transmitting the output of the scanner 115 to the database 120.

In some embodiments, the network system 100 may perform a plurality of network scans for the plurality of devices to detect changes in the network environment. In some embodiments, the trained encoder 122 may dynamically track modifications within the plurality of devices by storing scan results in the database 120. In certain embodiments, the modifications that can be tracked may include new devices added; software installations or updates; and configuration changes. In other embodiments, the new devices may be identified by a unique identification code not found within the database 120. In some embodiments, the plurality of network scans may generate the plurality of vectors associated with each unique identification code and the plurality of features associated with each unique identification code.

In some embodiments, the network system 100 may calculate a similarity score for one or more devices within the plurality of devices based on the plurality of unique identification codes, specifically the plurality of vectors and the plurality of features in comparison to a predetermined threshold of criticality. In certain embodiments, the database 120 may provide a centralized repository for scan results to optimize centralized reporting and analysis. In some embodiments, the trained encoder 122, in communication with the database 120, may generate reports, visualize trends, and analyze patterns within the target network 102. For example, the trained encoder 122 may generate a plurality of notifications that can be displayed via a user interface, where the plurality of notifications may facilitate decision-making, risk assessment, and resource allocation for the plurality of devices within the target network 102.

In some embodiments, the at least one analytics application(s) 130 may query the database 120 to retrieve scan results, analyze scan results, and generate a plurality of unique identification codes to provide digital fingerprints to one or more devices within the plurality of devices and displayed via a user interface to end users. In some embodiments, the at least one analytics application(s) 130 may involve the process of collecting and analyzing network data to improve various aspects of the target network 102. The present disclosure describes a system and method to automate assigning digital fingerprints to each device within the plurality of devices.

In some embodiments, the analytics applications 130 extract intelligence from data collected from diverse sources: network devices (such as switches, routers, and wireless access points), servers (including syslog, DHCP, AAA, and configuration databases), and traffic-flow details (such as wireless congestion, data speeds, and latency). The extracted intelligence may be displayed in the analytics applications 130 and provide insights of the target network 102 that include, but are not limited to, identifying performance bottlenecks, evaluating the health of network devices, recommending adjustments to enhance performance, analyzing traffic to and from endpoints to build profiles, detecting anomalies (even in encrypted traffic) that may indicate compromised endpoints, and/or any combination thereof.

As shown in FIG. 1, the insights generated by analytics application 130 may be provided to both the dashboards 140 and the network management system 150. In some embodiments, the dashboards 140 display information about vulnerabilities present on the target network 102, hosts on the network, and an overall summary of the network.

In some embodiments, the network management system 150 may be an application or set of applications that enables network administrators to manage various components within the target network. The network management system 150 provides a unified platform for configuring, monitoring and optimizing network performance. In one or more embodiments, the network management system 150 allows administrators to set up and adjust network devices (such as switches, routers, and access points) according to specific requirements. The network management system 150 collects real-time data from network elements and endpoint devices (e.g., mobile phones, laptops). This data helps proactively identify performance issues, monitor security, and segment the network. The network management system 150 improves information technology and network monitoring (including debugging, security, etc.) by accelerating problem resolution by providing insights into network health and performance. The network management system 150 assists in monitoring security events, detecting anomalies, and ensuring compliance with security policies.

To communicate the harm that specific vulnerabilities could pose if exploited, organizations use scores calculated using the Common Vulnerability Scoring System (CVSS) framework. While CVSS scores are one factor that may inform risk assessments, they do not contextualize the risk a specific vulnerability poses to the security of the overall network.

For instance, a critical vulnerability on a device that communicates with only one other isolated workstation on a network poses relatively low risk. If exploited, an intruder gaining access to the network could only reach two workstations out of an entire network.

The risk score methodology proposed herein contextualizes risk based on various factors. There may be scores, methodologies, or formulas at four different levels within the proposed framework. The first level may be contextualized vulnerability risk scores, which may be a linear combination of components and weights relevant to contextualizing risk posed by specific vulnerabilities. In some other embodiments, the combination of components and the weights may be non-linear, logarithmic, exponential, or other form of combination or any combination thereof.

The contextualized risk posed by a vulnerability to a network, or a host contained therein may be estimated by a vulnerability risk score (VRS). In embodiments, the VRS may be a combination of components and/or weights relevant for contextualizing risk from a vulnerability, such as a linear combination, non-linear combination, logarithmic combination, exponential combination, or other form of combination or any combination thereof.

Components include, but are not limited to, CVSS scores, exploitability (e.g., whether the vulnerability is known to be exploitable), and identified links to one or more bad actors (e.g., if bad actors are known to exploit this specific vulnerability or those like it). The CVSS may be a method used to assess the severity of vulnerabilities and provides a qualitative measure of severity, but CVSS scores are not a direct measure of risk. The CVSS may include three metric groups: Base, Temporal, and Environmental. The Base metrics, which represent the innate characteristics of each vulnerability, include a numerical score (ranging from 0 to 10) and a vector string.

CVSS scores are industry-standard measures between zero and ten that quantify the severity of a given vulnerability. CVSS scores may also account for whether a vulnerability is exploitable or not. Severe vulnerabilities are likely to be exploitable, but it's not a guarantee.

TABLE 1 presents exemplary qualitative severity ratings for both CVSS v2.0 and v3.x. Although not shown in TABLE 1, the present disclosure may also be applied to CVSS v4 and beyond.

TABLE 1

| Severity | Score Range (v2.0) | Score Range (v3.x) |
| --- | --- | --- |
| None |  | 0.0 |
| Low | 0.0-3.9 | 0.1-3.9 |
| Medium | 4.0-6.9 | 4.0-6.9 |
| High | 7.0-10.0 | 7.0-8.9 |
| Critical |  | 9.0-10.0 |

The components and weights used to derive VRS may be scaled to constrain the range of VRS. For example, if each component is scaled from 0 to 100 and the weights sum to 1, VRS falls between 0 and 100 by construction.

In some embodiments, the VRS for a given vulnerability is the same for all hosts with the detected vulnerability. In other words, the VRS may be device agnostic.

The weights used to derive VRS may be empirically determined, tuned in an automated fashion, or set by a user of the presently disclosed network characterization and management system 150.

In some implementations, automatically tuning weights may include a target variable, which may include but is not limited to:

A binary variable indicating if the vulnerability is known to be exploited on the network of interest; and/or The time between first detection and patch date on a network for a specific vulnerability.

Linear regression is one example of a tuning method given the current formula for VRS; other approaches may be utilized to include one or more interaction terms, higher-order components (e.g., $x^2$ for a given component x), and/or other similarly suitable parameters.

For example, if we have the following components and weights:

Components: [1] CVSS v3 Base Score=9.8 (component=98), [2] Exploitability: Yes (component=100), [3] Identified Link to One or More Bad Actors: Yes (component=100).

Weights (for [1], [2], and [3], respectively): 0.6, 0.25, 0.15

VRS=0.6(98)+0.25(100)+0.15(100)=98.8.

For example, a calculation of how to reach the final score may include base score ranges from zero to ten. In this example, the vulnerability may be known to be exploited and has been identified as being exploited by one or more threat groups of concern. A weight may be assigned to each factor here for each component. The formula then may be just weight times component. Each of the products may be scaled between zero and 100. That results in the final score. For example, if there are 100 devices in a network and the same vulnerabilities detected on five of those devices, the risk score may be the same for that vulnerability on all of those devices, i.e., the risk score may be device agnostic.

Alternatively, the "Exploitability" component, instead of being binarized (0 or 100), may be a continuous value that accounts for factors like the (1) time since the first reported exploit, (2) number of reported exploits in the last N days, and (3) number of reported exploits by relevant bad actors.

The "Identified Link to One or More Bad Actors" component, instead of being binarized (0 or 100), may also be a continuous value that accounts for factors such as (1) the fraction of bad actors on a user-defined watchlist known to exploit the specific vulnerability, (2) the recent activity levels of linked bad actors, and (3) the relative prominence of linked bad actors.

However, the severity of threats from different bad actors may be different, so in some embodiments, a quantitative measure of the degree of risk posed by each specific bad actor may be used to derive the "Identified Link to One or More Bad Actors" component. This value may be continuous or discrete and depend on how threats from bad actors are characterized.

In some embodiments, the link between bad actors and threat groups may be provided by a third-party threat intelligence data provider. In other embodiments, this may be determined by a module within the analytics application 130 that parses one or more intelligence feeds, such as one or more proprietary and/or open source threat intelligence feeds. In some embodiments, the link between bad actors and threat groups may be provided by manual input, such as by an administrator or analyst associated with the network.

In some embodiments where bad actors are known to preside in specific geographic locations and pose risk to specific networks and/or capabilities, the country of origin for those bad actors may also be incorporated into the "Identified Link to One or More Bad Actors" component. This would then increase the relative magnitude of the component. Further, other factors, such as the capability or intent of bad actors, may influence the "Identified Link to One or More Bad Actors" component. For example, a nascent group that has not caused major disruptions would pose less of a risk than advanced persistent threats (APT). As another example, an established APT known to target government infrastructure or successfully breached said networks poses a greater risk to government networks.

In some implementations, the VRS may include, but is not limited to, the above detailed components. Indeed, the VRS may be extensible (e.g., the VRS may incorporate other new and/or independent components). If there are other factors a user wants to include, the formula, in the presently disclosed method may incorporate those. Each new component must be assigned a weight. The weights used to derive VRS may be empirically determined, tuned in an automated fashion, or set by a user of the presently disclosed network characterization and management system 150.

The second level of risk in the proposed risk methodology consists of a host risk score (HRS). HRS may be calculated by aggregating vulnerability risk scores for all vulnerabilities detected on the host, layering on additional contextual information as available. The contextualized risk posed by a vulnerability to a host contained therein may be estimated by a vulnerability risk score (VRS). In embodiments, the VRS may be a combination of components and/or weights relevant for contextualizing risk from a vulnerability, such as a linear combination, non-linear combination, logarithmic combination, exponential combination, or other form of combination or any combination thereof.

Components of HRS include, but at not limited to:

Maximum Vulnerability Risk Score (taken across all vulnerabilities detected on the host).

Host Criticality (as determined by the user or via Automated Key Terrain Identification, which quantifies host criticality by deriving host criticality scores (HCS) to hosts).

Number of Vulnerabilities Detected on host (relative to the total number of vulnerabilities detected on network).

The components and weights used to calculate HRS may be scaled to ensure the final score falls in a defined range by construction (same as the VRS).

The weights used to calculate HRS may be empirically determined, tuned in an automated fashion, or set by the user of the presently disclosed network characterization and management system (same as VRS).

In some implementations, automatically tuning weights requires a target variable, which may include but is not limited to:

Indicator variable highlighting if the host was known to be exploited on the network of interest Categorical variable assigned by risk analyst/patch manager that quantifies risk Linear regression is one example of a tuning method given the current formula for HRS; other approaches may be viable if the formula is extended to include interaction terms, higher-order components (e.g., $x^2$ for a given component x).

For example,

Components (scaled to each lie between 0 and 100):

[1] Maximum VRS=Max ([98.8, 53.4, 23.1, 57.2])=98.8.

[2] Host Criticality (set by user)→90 (arbitrarily defined for this example).

[3] Number of Vulnerabilities Detected on the Host=4/8 (total detected on network)=0.5→50 (after scaling).

Weights (for [1], [2], and [3], respectively): 0.8, 0.15, 0.05.

HRS=0.8(98.8)+0.15(90)+0.05(50)=95.0.

In some implementations, instead of taking maximum VRS, other aggregation method(s) may be used to account for the distribution of VRS for all vulnerabilities detected on the host.

In some implementations, the "Host Criticality" component may be binarized (e.g., critical or not critical) instead of being a continuous value. This component may also be emergent from the solution for the automated key terrain identification.

In some implementations, the "Number of Vulnerabilities Detected on the Host" component, instead of a simple fraction, may account for other factors including (1) severity (as quantified by CVSS score), (2) exploitability, and (3) patchability.

In some implementations, the HRS calculation may incorporate other new and/or independent components if other contextual information about hosts is available.

The third level of risk in the proposed risk score methodology is network risk score (NRS). NRS represents aggregated host risk scores for all hosts identified on a network to get a single quantitative measure of risk for the entire network. Aspects of embodiments of NRS may be applied to smaller collections of hosts uniquely grouped (e.g., subnets) as well. The contextualized risk posed by a vulnerability to a network contained therein may be estimated by a vulnerability risk score (VRS). In embodiments, the VRS may be a combination of components and/or weights relevant for contextualizing risk from a vulnerability, such as a linear combination, non-linear combination, logarithmic combination, exponential combination, or other form of combination or any combination thereof.

Components used to calculate NRS include but are not limited to:
  Maximum Host Risk Score (taken across all hosts on the network).
  Mean Host Risk Score (taken across all hosts on the network).

The components and weights used to calculate NRS may be scaled to ensure the final score falls in a defined range by construction (same as VRS, HRS).

Weights may be empirically determined, tuned in an automated fashion, or set by the user of the presently disclosed network characterization and management system (same as VRS and HRS).

In some implementations, automatically tuning weights may include a target variable, which may include but is not limited to:
  Indicator variable highlighting if network known to be exploited Linear regression is one example of a tuning method given the current formula; other approaches would be viable if the formula is extended to include interaction terms, higher-order components (e.g., $x^2$ for a given component x).

For example,
Components:
  [1] Maximum HRS: 92.0
  [2] Mean HRS: 73.2
Weights (for [1] and [2], respectively): 0.8, 0.2
NRS=0.8(92.0)+0.2(73.2)=88.2.

In some implementations, instead of taking maximum and mean HRS, other aggregation method(s) may be used to account for the distribution of the HRS for all hosts on a network. For example, if the distribution of HRS is discretized, component values may be fractions of the distribution (e.g., area under the curve) in each discrete HRS range.

In some implementations, the NRS calculation may incorporate other new and/or independent components if contextual information about the network is available.

Risk scores (VRS, HRS and NRS) may be used to quantify degrees of risk over time and provide quantitative measures of risk that may be used to prioritize remediation strategies.

In some implementations, patch managers can sort detected vulnerabilities by VRS and prioritize patching vulnerabilities with high VRS. This may be an improvement over patching based on CVSS scores that do not contextualize the degree of risk a vulnerability poses to a specific network.

In some implementations, cyber analysts protecting a network can sort hosts detected on the network by HRS and overlay complementary information to perform a proper risk assessment. For example, host criticality may quantify how essential the operations a given host performs in reference to the overall operation of the network (or other business problem). When paired with HRS, analysts may rapidly identify what critical infrastructure is most at risk for exploitation. Further, overlaying HRS with network traffic data (e.g., PCAP files which is a packet capture created by Wireshark, a free network data analysis program. It contains network packet data that Wireshark intercepted and logged while monitoring a network.) would provide amplifying information for determining which hosts to patch next to improve overall defensive posture, as that would provide viable paths bad actors could take through the network given an entry point.

In some implementations, organizations managing multiple networks can compare NRS across networks to assess relative security of each network and manage remediation efforts across multiple networks. Consistent scaling and/or bounding the components that underlie each risk score enables direct comparison of relative magnitudes of scores.

The security of a network is only as strong as its weakest link. Consequently, risk score calculations may be based on around maximum scores. Consider a router that directs traffic to every workstation on a network—the router plays a more critical role in network operations than a printer tucked away in a corner, which only one computer can print to. Quantitative risk assessment involves calculating risk scores and taking into account such factors in the form of host criticality.

The present disclosure aggregates the host risk scores calculated for all hosts on a network to calculate network risk score, adhering to the principle that a network may be only as strong as its weakest link. The components can be broken down to:
  Maximum Host Risk: Suppose your network consists of 100 hosts, and the highest host risk score is 92. This component contributes 92 to the overall risk assessment.
  Average Host Risk: Now consider the remaining 99 hosts. If their risk scores are all less than 10, the situation differs from having an ISP with a score of 92 and the rest uniformly distributed between 0 and 100. The average host risk captures the entire trend of the network.

The present disclosure employs dashboards to present views of risk at various levels (vulnerability, host, network). Each vulnerability has a unique identifier, allowing users to review information about individual vulnerabilities. Additionally, the present disclosure offers a host dashboard with unique identifiers. Users can view the host risk score and the contributing factors used to compute it. This facilitates quick assessments—for instance, identifying devices at higher risk and determining reasons to inform remediation efforts.

The presently disclosed solution includes implicitly learning contextual information from vulnerability scans. By analyzing scan data, for example, users can examine the services running on each host and infer host criticality. For example, a server running SQL Server may house a critical database essential for network operations. While the user may explicitly highlight a specific server's importance, implicit insights emerge from the services associated with each host.

According to present disclosure, one approach to augmenting the insights emergent from the risk score methodology may be leveraging network sensors that detect traffic. For instance, if a router handles 90% of network traffic over a seven-day period, this router may serve as a true signal of day-to-day network operations and is important to factor into a risk assessment.

Alternatively, users can designate critical hosts manually. Imagine a sensitive network with an authentication server for a highly critical application but that server is not scanned regularly. If that authentication server becomes compromised, the authentication server could break authentication, granting unauthorized access to sensitive resources. In this scenario, the server hosting the authentication functionality automatically becomes critical, yet the information used to implicitly determine host criticality is not available.

The risk score methodology may also be viewed as a component of a broader solution that generates a network map to allow the user to contextualize the importance of various nodes or hosts within a network.

One or more technical challenges associated with the proposed risk score methodology is comparing scores across different tiers. Without standardized thresholds, gauging the relative significance of each score becomes unworkable. Establishing consistent benchmarks enables navigating this complexity.

For example: in a certain locale, a high threshold for a network might be anything above 90, while a low threshold could be anything below 85. However, the numbers can appear equally high because the vulnerability threshold may range from 75 to 100 or even lower. For instance, a vulnerability score of 50 to 100 indicates a very high risk for a learner's network. Additionally, the difference between scores like 86 and 88 may be quite significant.

The present disclosure pertains to network risk assessment. The dashboard views may provide examples of insights in the network, host, and vulnerability view. Users can filter by specific network IDs and access summary statistics. Beyond the risk score, the dashboard(s) may include additional contextual information embedded in the dashboards. For example, in the host view:

Host Count: number of hosts present on the network.
Services Running: services these hosts run.
Host Types: numbers of servers, routers, or workstations.

This holistic approach combines theoretical underpinnings with user-friendly interface to achieve comprehensive protection for the network.

FIG. 2 shows a dashboard displaying vulnerability risk score and descriptive data from publicly available data sources (e.g., NIST, NVD, CISA's Known Exploited Vulnerabilities Catalog) for a specific vulnerability, as identified by the Common Vulnerabilities and Exposures (CVE) system. The infographic also displays factors used to determine VRS. Users of the presently disclosed network characterization and management system may be presented with recommended actions based on the reported VRS.

Similar to VRS, HRS may be presented in a dashboard view that displays descriptive information about a given host.

Figure 3:
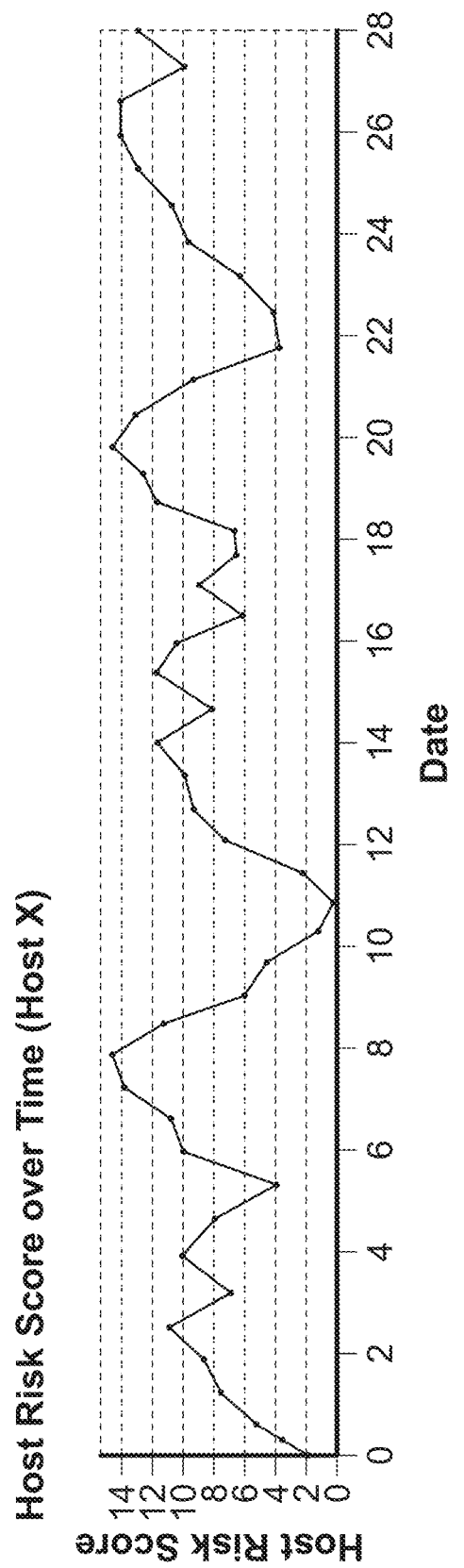
FIG. 3 is a line chart displaying a host risk score over time for a selected host (Host X).

FIG. 3 is a line chart displaying a host risk score over time for a selected host (Host X). Data used to determine HRS may be embedded in the line chart (available by clicking on points) or in another dashboard element. A downward trend of the HRS over time may indicate that a patch applied to the host may be effective in reducing the risk. On the other hand, an upward trend of the HRS over time may indicate that a different remediation measure needs to be applied to the host.

Figure 4:
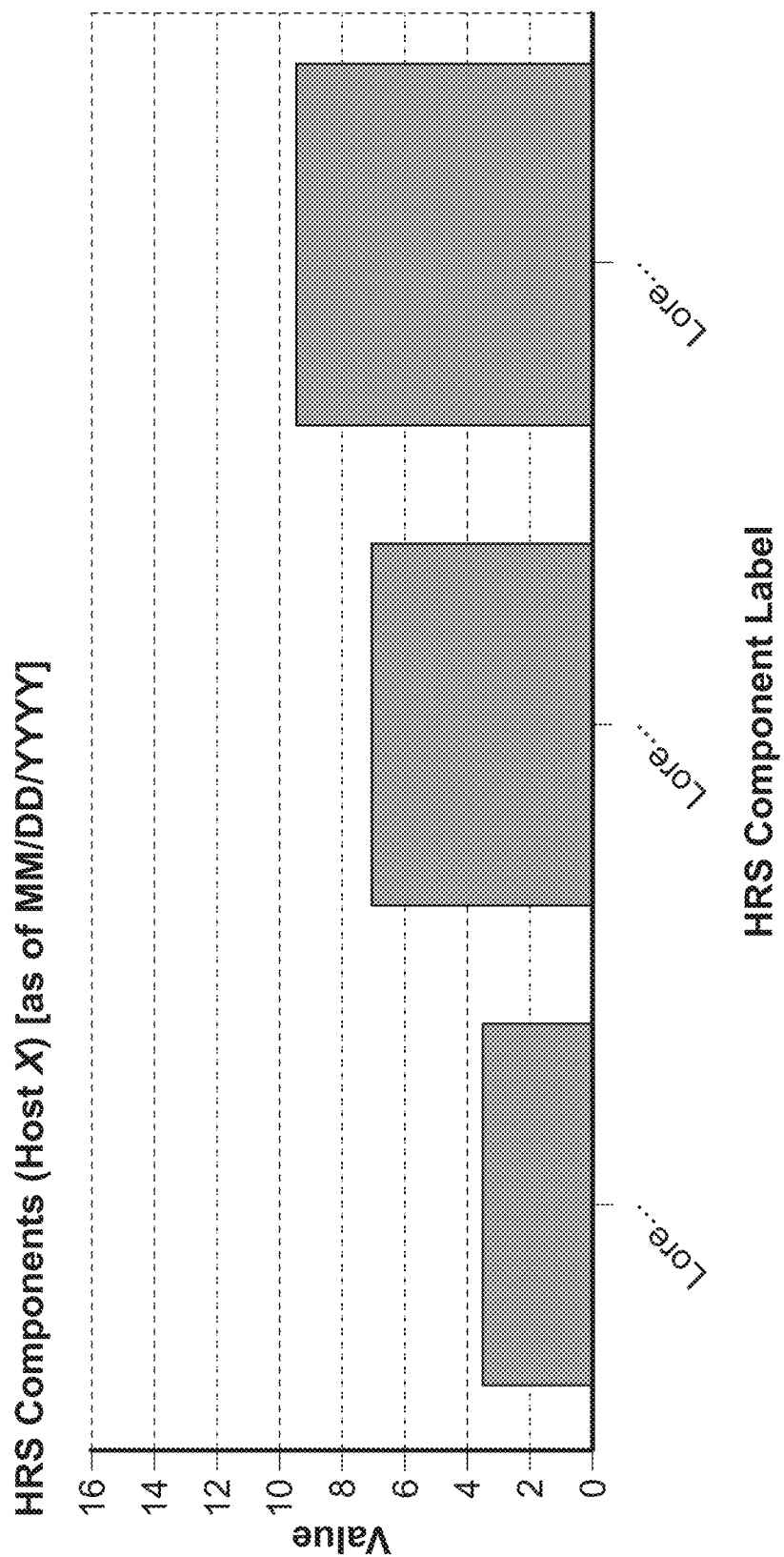
FIG. 4 is a bar chart showing component scores used to calculate HRS to enable deeper analyses.

FIG. 4 is a bar chart showing component scores used to calculate HRS to enable deeper analyses.

Figure 5:
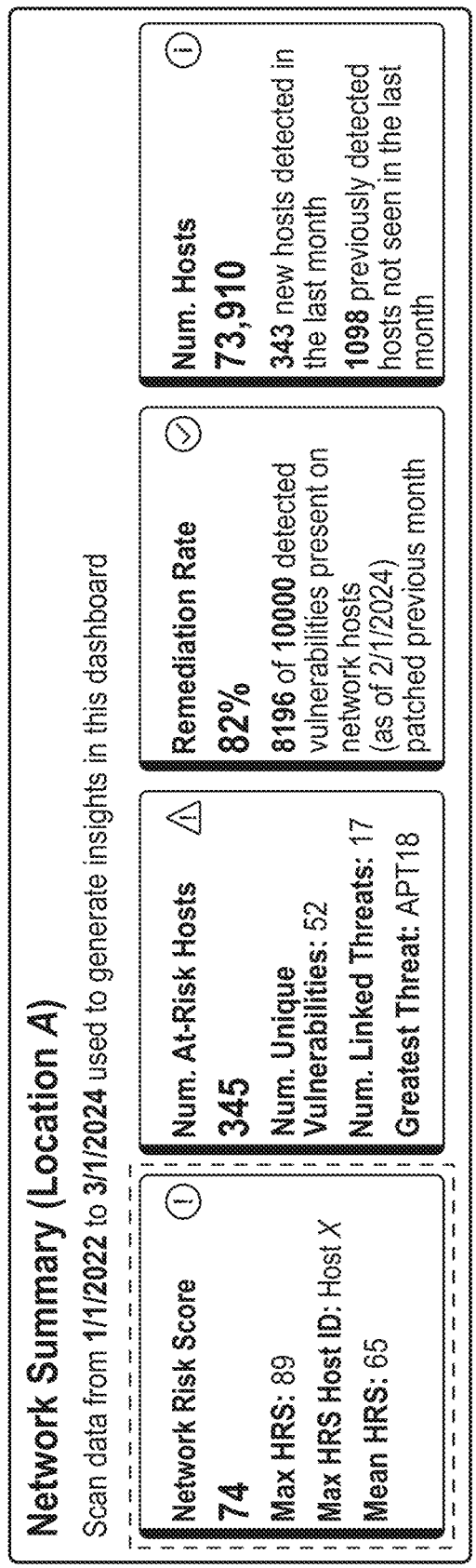
FIG. 5 shows a dashboard displaying network risk score (NRS) and aggregate statistics about identified hosts, detected vulnerabilities, and linked threats for a selected network.

FIG. 5 shows a dashboard displaying network risk score (NRS) and aggregate statistics about identified hosts, detected vulnerabilities, and linked threats for a selected network. Infographic displays factors used to determine the NRS.

FIG. 6 shows a dashboard with a table displaying other host-related information, such as host type, host type confidence, host risk score and host criticality score, that the presently disclosed network characterization and management system may utilize to prioritize patch management and/or proactively improve cyber defense posture.

Figure 7:
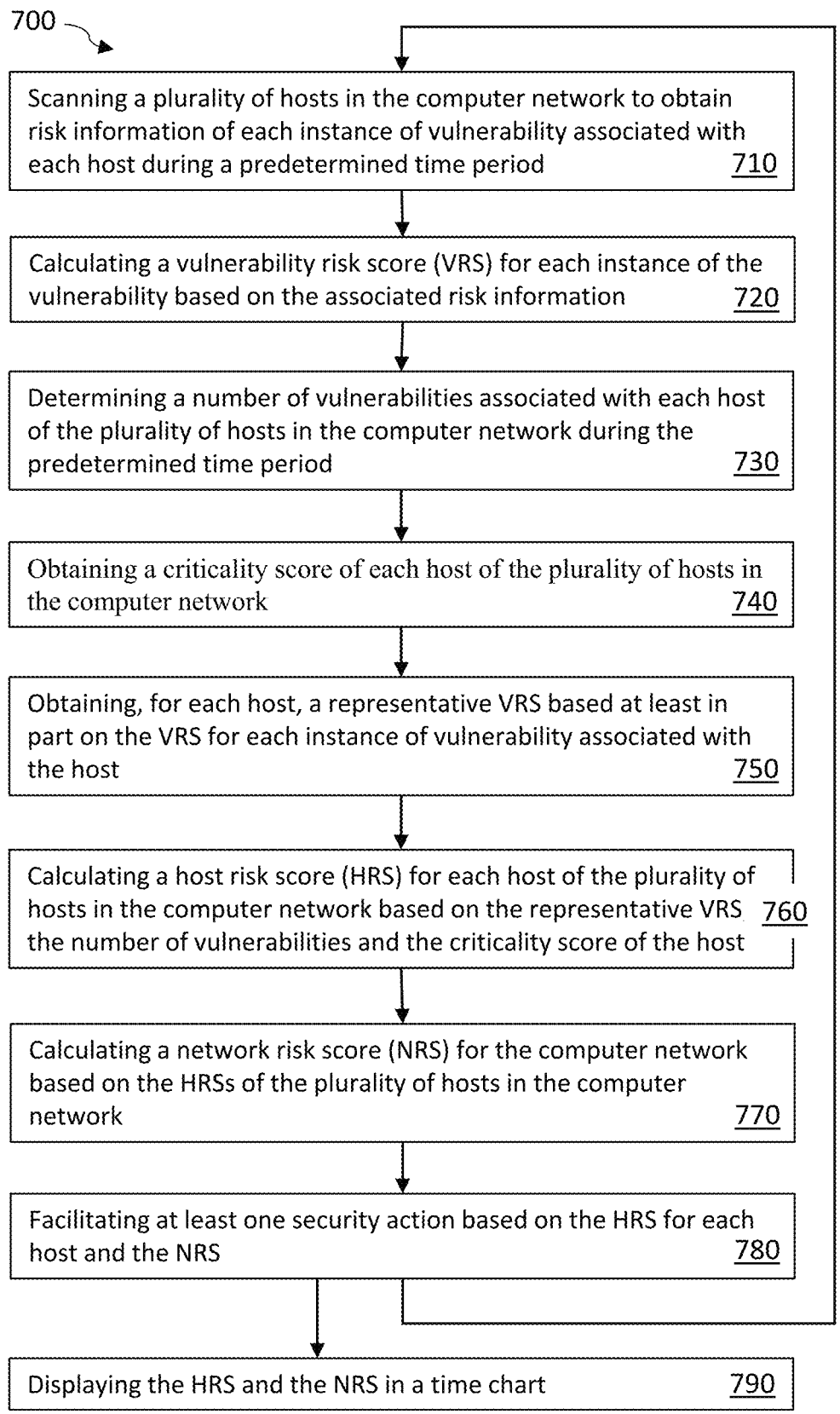
FIG. 7 is a flowchart illustrating an exemplary computer network management process in accordance with one or more embodiments of the present disclosure.

FIG. 7 is a flowchart illustrating an exemplary computer network management process 700 in accordance with one or more embodiments of the present disclosure. The steps shown in FIG. 7 can be performed by any suitable computer-executable code and/or computing system, including system 100 in FIG. 1, and/or variations or combinations of one or more of the same. In one example, each of the steps shown in FIG. 7 can represent an algorithm whose structure includes and/or is represented by multiple sub-steps, examples of which will be provided in greater detail below.

In step 710, a computing device scans a plurality of hosts in a computer network to obtain risk information of each instance of vulnerability associated with each host during a predetermined time period. In some embodiments, the risk information includes a common vulnerability scoring system (CVSS) score, an exploitability measurement and a measurement parameter of identified link to one or more bad actors.

In step 720, the computing device calculates a vulnerability risk score (VRS) for each instance of the vulnerability based on the associated risk information. In some embodiments, the VRS has a linear relationship with the associated CVSS score, the associated exploitability measurement and the associated measurement parameter of identified link to one or more bad actors, each carrying a weight.

In step 730, the computing device determines a number of vulnerabilities associated with each host of the plurality of hosts in the computer network during the predetermined time period.

In step 740, the computing device obtains a criticality score of each host of the plurality of hosts in the computer network.

In step 750, the computing device obtains, for each host, a representative VRS based at least in part on the VRS for each instance of vulnerability associated with the host. In some embodiments, the representative VRS may be the one that has the highest value among the VRSs of the host.

In step 760, the computing device calculates a host risk score (HRS) for each host of the plurality of hosts in the computer network based on the representative VRS, the number of vulnerabilities and the criticality score of the host. In some embodiments, the HRS of a host has a linear relationship with the representative VRS, the number of vulnerabilities and the criticality score of the host, each carrying a weight.

In step 770, the computing device calculates a network risk score (NRS) for the computer network based on the HRSs of the plurality of hosts in the computer network.

In step 780, the computing device facilitates at least one security action based on the HRS for each host and the NRS.

As shown in FIG. 7, the process 700 repeats steps 710 through 780 at a predetermined frequency.

In step 790, the computing device display the HRS and the NRS over in a time chart, so that the network security situation can be observed in real time.

At least some aspects of the present disclosure will now be described with reference to the following numbered clauses.

Clause 1. A computer-implemented method including:
determining, by a computing device, a plurality of risk scores of a computer network at a first time, the determining including: scanning, by the computing device, a plurality of hosts in the computer network to obtain risk information of each instance of vulnerability associated with each host during a predetermined time period, where the risk information includes a common vulnerability scoring system (CVSS) score, an exploitability measurement and a measurement parameter of identified link to one or more bad actors; calculating, by the computing device, a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining, by the computing device, a number of vulnerabilities associated with each host of the plurality of hosts in the computer network during the predetermined time period; obtaining, by the computing device, a criticality score of each host of the plurality of hosts in the computer network; obtaining, by the computing device, for each host, a representative VRS based at least in part on the VRS for each instance of vulnerability associated with the host; calculating, by the computing device, a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; calculating, by the computing device, a network risk score (NRS) for the computer network based on the HRS of each host of the plurality of hosts in the computer network; and facilitating, by the computing device, at least one security action based on the HRS for each host and the NRS; repeating, by the computing device, the determining the risk scores at a second time; and displaying, by the computing device, the HRS and the NRS over the first and second time in a chart.

Clause 2. The method of clause 1, where each of the CVSS score, the exploitability measurement and the measurement parameter of identified link to one or more bad actors in the linear relationship with the associated VRS carries a weight.

Clause 3. The method of clause 1, where a value of either the CVSS score, the exploitability measurement or the measurement parameter of identified link to one or more bad actors is different between the first and second time.

Clause 4. The method of clause 1, where each of the representative VRS, the number of vulnerabilities and the criticality score of the host in the linear relationship with the associated HRS carries a weight.

Clause 5. The method of clause 1, where a value of either the representative VRS, the number of vulnerabilities or the criticality score of the host is different between the first and second time.

Clause 6. The method of clause 1, the representative VRS has a highest value among the VRSs of the host.

Clause 7. The method of clause 1, further including determining, by the computing device, a maximum HRS and a mean HRS in the plurality of hosts and using the maximum HRS and the mean HRS to calculate the NRS.

Clause 8. The method of clause 7, where the NRS has a linear relationship with the maximum HRS and the mean HRS, each of the maximum HRS and the mean HRS carrying a weight.

Clause 9. The method of clause 8, where a value of either the maximum HRS or the mean HRS is different between the first and second time.

Clause 10. The method of clause 1, further including storing, by the computing device, the VRS, HRS and NRS in a database.

Clause 11. The method of clause 1, further including obtaining, by the computing device, network traffic information at each host of the plurality of hosts in the computer network at the first and second time and display the network traffic information along with the HRS and NRS in the chart.

Clause 12. The method of clause 1, further including displaying, by the computing device, a topology of network with the HRS at the first time assigned to each host in the computer network.

Clause 13. A computer-implemented method including: determining, by a computing device, a plurality of risk scores of a computer network at a first time, the determining including: scanning, by the computing device, a plurality of hosts in the computer network to obtain risk information of each instance of vulnerability occurred to each host during a predetermined time period, where the risk information includes a common vulnerability scoring system (CVSS) score, an exploitability measurement and a measurement parameter of identified link to one or more bad actors; calculating, by the computing device, a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining, by the computing device, a number of vulnerabilities associated with each host of the plurality of hosts in the computer network during the predetermined time period; obtaining, by the computing device, a criticality score of each host of the plurality of hosts in the computer network; obtaining, by the computing device, for each host, a representative VRS based at least in part on the VRS for each instance of vulnerability associated with the host, the representative VRS having a highest value among the VRSs of the host; calculating, by the computing device, a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; determining, by the computing device, a maximum HRS and a mean HRS in the plurality of hosts; and calculating, by the computing device, a network risk score (NRS) for the computer network based on the maximum HRS and the mean HRS; altering, by the computing device, at least one network security topology based on the HRS for each host and the NRS; repeating, by the computing device, the determining the risk scores at a second time; and displaying, by the computing device, the HRS and the NRS over the first and second time in a chart.

Clause 14. The method of clause 13, where each of the CVSS score, the exploitability measurement and the measurement parameter of identified link to one or more bad actors in the linear relationship with the associated VRS carries a weight.

Clause 15. The method of clause 13, where the value of either the CVSS score, the exploitability measurement or the measurement parameter of identified link to one or more bad actors is different between the first and second time.

Clause 16. The method of clause 13, where each of the representative VRS, the number of vulnerabilities and the criticality score of the host in the linear relationship with the associated HRS carries a weight.

Clause 17. The method of clause 16, where the weight of either the representative VRS, the number of vulnerabilities or the criticality score of the host is different between the first and second time.

Clause 18. The method of clause 13, where the NRS has linear relationship with the maximum HRS and the mean HRS, each carrying a weight.

Clause 19. The method of clause 18, where the value of either the maximum HRS or the mean HRS is different between the first and second time.

Clause 20. The method of clause 13, further including obtaining, by the computing device, network traffic information at each host of the plurality of hosts in the computer network at the first and second time and display the network traffic information along with the HRS and NRS in the chart.

Clause 21. A system, including: one or more processors; and a memory in communication with the one or more processors and storing instructions that, when executed by the one or more processors, cause the one or more processors to: determine a plurality of risk scores of a computer network at a first time, the determining including: scanning a plurality of hosts in the computer network to obtain risk information of each instance of vulnerability associated with each host during a predetermined time period, where the risk information includes a common vulnerability scoring system (CVSS) score, an exploitability measurement and a measurement parameter of identified link to one or more bad actors; calculating a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining a number of vulnerabilities associated with each host of the plurality of hosts in the computer network during the predetermined time period; obtaining a criticality score of each host of the plurality of hosts in the computer network; obtaining, for each host, a representative VRS based at least in part on the VRS for each instance of vulnerability associated with the host; calculating a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; calculating a network risk score (NRS) for the computer network based on the HRS of each host of the plurality of hosts in the computer network; and facilitating at least one security action on the computer network based on the HRS for each host and the NRS; repeat the determining the risk scores at a second time; and display the HRS and the NRS over the first and second time in a chart.

Clause 22. The system of clause 21, where each of the CVSS score, the exploitability measurement and the measurement parameter of identified link to one or more bad actors in the linear relationship with the associated VRS carries a weight.

Clause 23. The system of clause 21, where a value of either the CVSS score, the exploitability measurement or the measurement parameter of identified link to one or more bad actors is different between the first and second time.

Clause 24. The system of clause 21, where each of the representative VRS, the number of vulnerabilities and the criticality score of the host in the linear relationship with the associated HRS carries a weight.

Clause 25. The system of clause 21, where a value of either the representative VRS, the number of vulnerabilities or the criticality score of the host is different between the first and second time.

Clause 26. The system of clause 21, where the representative VRS has a highest value among the VRSs of the host.

Clause 27. The system of clause 21, where the instructions, when executed by the one or more processors further cause the one or more processors to determine a maximum HRS and a mean HRS in the plurality of hosts and use the maximum HRS and the mean HRS to calculate the NRS.

Clause 28. The system of clause 21, where the instructions, when executed by the one or more processors further cause the one or more processors to obtain network traffic information at each host of the plurality of hosts in the computer network at the first and second time and display the network traffic information along with the HRS and NRS in the chart.

Clause 29. The system of clause 21, where the instructions when executed by the one or more processors, further cause the one or more processors to store the VRS, HRS and NRS in a database.

Clause 30. A system, including: one or more processors; and a memory in communication with the one or more processors and storing instructions that, when executed by the one or more processors, cause the one or more processors to: determine a plurality of risk scores of a computer network at a first time, the determining including: scanning a plurality of hosts in the computer network to obtain risk information of each instance of vulnerability occurred to each host during a predetermined time period, where the risk information includes a common vulnerability scoring system (CVSS) score, an exploitability measurement and a measurement parameter of identified link to one or more bad actors; calculating a vulnerability risk score (VRS) for each instance of the vulnerability based on the associated risk information, where the VRS has a linear relationship with the associated CVSS score, the associated exploitability measurement and the associated measurement parameter of identified link to one or more bad actors; determining a number of vulnerabilities associated with each host of the plurality of hosts in the computer network during the predetermined time period; obtaining a criticality score of each host of the plurality of hosts in the computer network; obtaining for each host, a representative VRS based at least in part on the VRS for each instance of vulnerability associated with the host, the representative VRS having a highest value among the VRSs of the host; calculating a host risk score (HRS) for each host of the plurality of hosts in the computer network based on the representative VRS, the number of vulnerabilities and the criticality score of the host, where the HRS of each host has a linear relationship with the representative VRS, the number of vulnerabilities and the criticality score; determining a maximum HRS and a mean HRS in the plurality of hosts; and calculating a network risk score (NRS) for the computer network based on the maximum HRS and the mean HRS; altering at least one network security topology based on the HRS for each host and the NRS; repeat the determining the risk scores at a second time; and display the HRS and the NRS over the first and second time in a chart.

The present disclosure describes, in detail, systems and methods of utilizing a trained encoder 122 to dynamically fingerprint a plurality of devices within a network of computers and automatically map a terrain of devices within the network based on each dynamic fingerprint. The following embodiments provide technical solutions and technical improvements over technical problems, drawbacks and/or deficiencies in the technical fields involving network security, digital fingerprinting, and network mapping. Specifically, a technological problem exists in merely relying on information for a host in a particular network to scan a configuration of the network at a particular time. Typically, a single configuration scan may provide information about devices on the network at the particular time of the scan, where the information may vary over time, especially when devices change physical and/or virtual location.

As explained in more detail below, technical solutions and technical improvements herein include aspects of improved technologies for utilizing an the trained encoder 122 to dynamically assign a unique identification code of a first device; comparing a value of the first device associated with a plurality of features based on the unique identification code; assigning a second unique identification code of a second device when a comparison produces a match; and calculating a similarity score between the first unique identification code and the second unique identification code. The trained encoder 122 may refer to a machine learning module capable of making comparisons across a plurality of fields that identify devices. In certain embodiments, the trained encoder 122 may refer to a plurality of logic trees capable of comparing unique identification codes and a plurality of features associated with each unique identification code for a plurality of devices. For example, these fields of comparison associated for each device may include internet protocol addresses, host names, associated media access control (MAC) addresses, detected operating systems, and detected services. In some embodiments, the unique identification code may refer to a digital fingerprint associated with each device. In some embodiments, each device may refer to a host computing device capable of performing operations within the network. The trained encoder 122 may also generate one or more vectors associated with each unique identification code for a particular device. In some embodiments, the terms host and device may be used in the present disclosure interchangeably. Each particular device may refer to a particular host device, such as a computing device, a server computing device, a workstation, a laptop, and/or a smartphone. In some embodiments, the trained encoder 122 may store the unique identification codes in an identification code database. In certain embodiments, the identification code database may refer to a data repository. The trained encoder 122 may scan the plurality of devices to obtain data related to a particular unique identification code associated with each device and the plurality of features associated with the particular unique identification code. In certain embodiments, the plurality of features may provide additional information on the particular device. The calculation of the similarity score may predict an optimal vector value for a particular device by identifying a component-wise average of the plurality of vectors across the plurality of devices, the vector associated with the particular device, and the vector with the highest frequency within the plurality of devices. In response to identifying each of these values, a removal of duplicate unique identification codes obtained within a single scan may be performed prior to calculating the similarity score, where the removal of the duplicate unique identification code may refer to a digital fingerprint for the particular device. In some embodiments, the similarity score between the plurality of devices may refer to a calculated cosine similarity between a vector value for the particular device and the vector values for the plurality of devices. In some embodiments, the trained encoder 122 may store the second unique identification code in response to the calculated similarity score exceeding a predetermined threshold of criticality. In certain embodiments, the predetermined threshold of criticality may refer to a value set for similarity scores to determine matches between at least two devices of the plurality of devices.

In some embodiments, the present disclosure may optimize the comparison of each vector associated with the unique identification code and each vector within the data repository. In certain embodiments, the data repository may contain a plurality of vectors associated with the plurality of devices. In some embodiments, a plurality of features within each vector may be assigned a particular weight based on historical data and/or user input, where a weighted feature may modify the similarity score calculation. In some embodiments, one or more processors of a computing device may perform similar functions of a trained encoder 122, such as generating one or more data embeddings for each unique identification code based on the plurality of vectors and the plurality of features. In some embodiments, the trained encoder 122 may be trained using historical unique identification codes for the plurality of devices and historical features associated with the historical unique identification codes. In certain embodiments, the trained encoder 122 may generate one or more data embeddings associated with a large collection of devices within a given network. The data embeddings may refer to a collection of unique identification codes associated with the plurality of devices, where each particular unique identification code may be a digital fingerprint for a particular device. In some embodiments, the trained encoder 122 may identify the plurality of features associated with the unique identification code associated with each device of the plurality of devices, generate the data embedding using a trained machine learning model and a generated vector for each feature, compute the similarity score between the data embedding associated with the particular device and the data embeddings associated with the plurality of devices, compare the calculated similarity score to the predetermined threshold of criticality to determine matches between data embeddings, and add the unique identification code of the particular device in response to a score that exceeds the threshold. For example, the trained encoder 122 may automatically map the plurality of devices within the network at a given time and dynamically track movement by the plurality of devices within the network.

In some embodiments, the output of the trained encoder 122 may be sent to a device interface that may generate a device summary report and a network summary report, where the device summary report may provide a host risk score, a number of vulnerabilities, a remediation rate, host IP information, and the network summary report may provide a network risk score, a number of at-risk hosts, a remediation rate, and a number of host within the network. In certain embodiments, the trained encoder 122 may identify a particular device within the plurality of devices based on the unique identification code. In certain embodiments, the trained encoder 122 may generate the network summary report by counting the plurality of unique identification codes.

Figure 8:
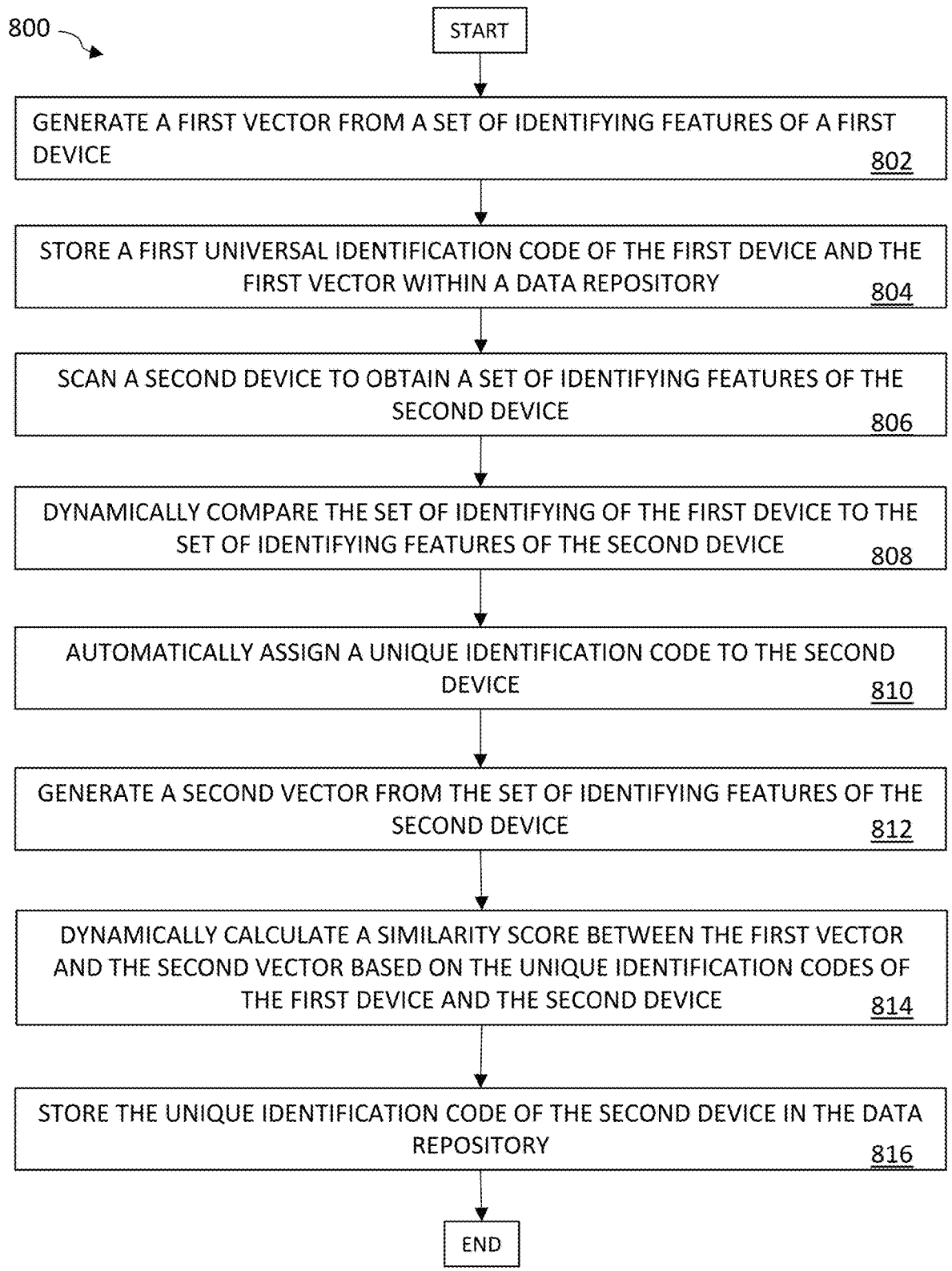
FIG. 8 is a flowchart illustrating operational steps for assigning a digital fingerprint to one or more devices of the plurality of devices based on a calculated similarity score between the plurality of unique identification codes, in accordance with one or more embodiments of the present disclosure.

FIG. 8 is a flowchart 800 depicting operational steps for assigning a digital fingerprint to one or more devices of the plurality of devices based on a calculated similarity score between the plurality of unique identification codes. In some embodiments, at least one processor of a computing device may perform the following steps, where the steps respectively correlate with 802-816 of FIG. 8.

In step 802, the at least one processor may generate a first vector from a set of identifying features of a first device. In step 804, the at least one processor may store a first universal identification code of the first device and the first vector within the database 120. In step 806, the at least one processor may scan a second device to obtain a set of identifying features of the second device. In step 808, the at least one processor may dynamically compare the set of identifying features of the first device to the set of identifying features of the second device. In step 810, the at least one processor may automatically assign a unique identification code to the second device, where the unique identification code is different from the unique identification code to the first device. In step 812, the at least one processor may generate a second vector from the set of identifying features of the second device. In step 814, the at least one processor may dynamically calculate a similarity score between the first vector and the second vector based on the unique identification codes of the first device and the second device. In step 816, the at least one processor may store the unique identification code of the second device to the database 120 in response to the similarity score being above a predetermined threshold.

In some embodiments, the unique identification code may refer to a digital fingerprint to efficiently identify each device of the plurality of devices within the target network 102. In some embodiments, the set of identifying features for each device may include the device IP address, a host name, one or more MAC address(es), a detected operating system, and one or more detected service(s). In some embodiments, the calculated similarity score may aggregate the vector of each device and a value associated with the set of identifying features for each device of the plurality of devices. In some embodiments, the trained encoder 122 may perform the steps 802-816 of FIG. 8.

Figure 9:
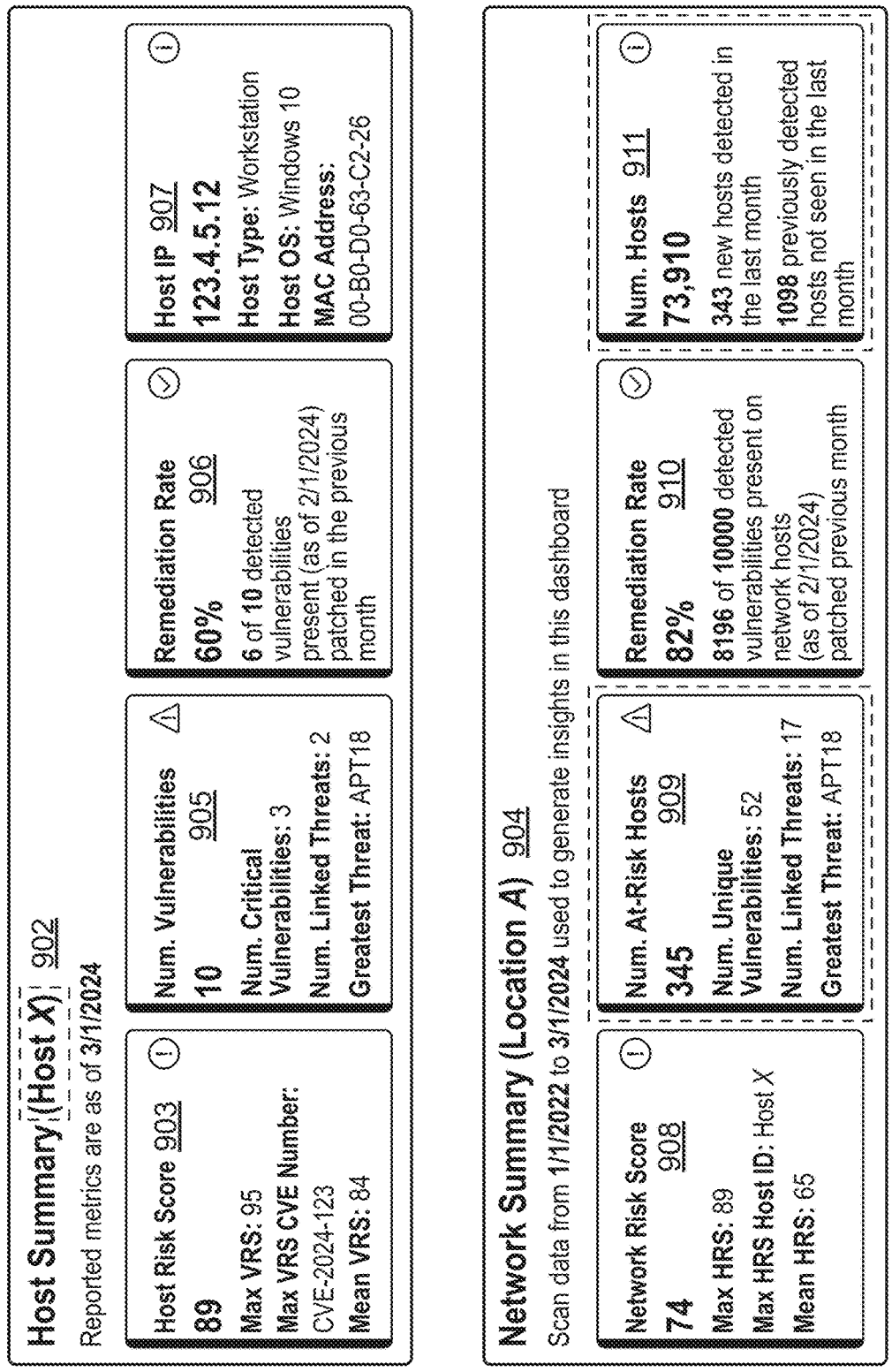
FIG. 9 depicts an example output using the trained encoder and the at least one analytics application(s) based on the scans of the plurality of devices within the target network, in accordance with one or more embodiments of the present disclosure.

FIG. 9 depicts an example output 900 using the trained encoder 122 and the at least one analytics application(s) 130 based on the scans of the plurality of devices within the target network 102, specifically the comparison of the plurality of vectors and the set of identifying features for each device based on the unique identification codes for each device of the plurality of devices. The output of the trained encoder 122 may be utilized by the analytics application 130 to display, via a user interface and/or the analytics application(s) 130, a device summary report 902 and a network summary report 904. In the device summary report 902, a host risk score 903, a number of detected vulnerabilities 905, a remediation rate 906, and a device IP information 907 may be displayed via the user interface. In the network summary report 904, a network risk score 908, a number of at-risk hosts 909, a remediation rate 910, and a number of hosts 911 within the plurality of devices may be displayed via the user interface.

Figure 10:
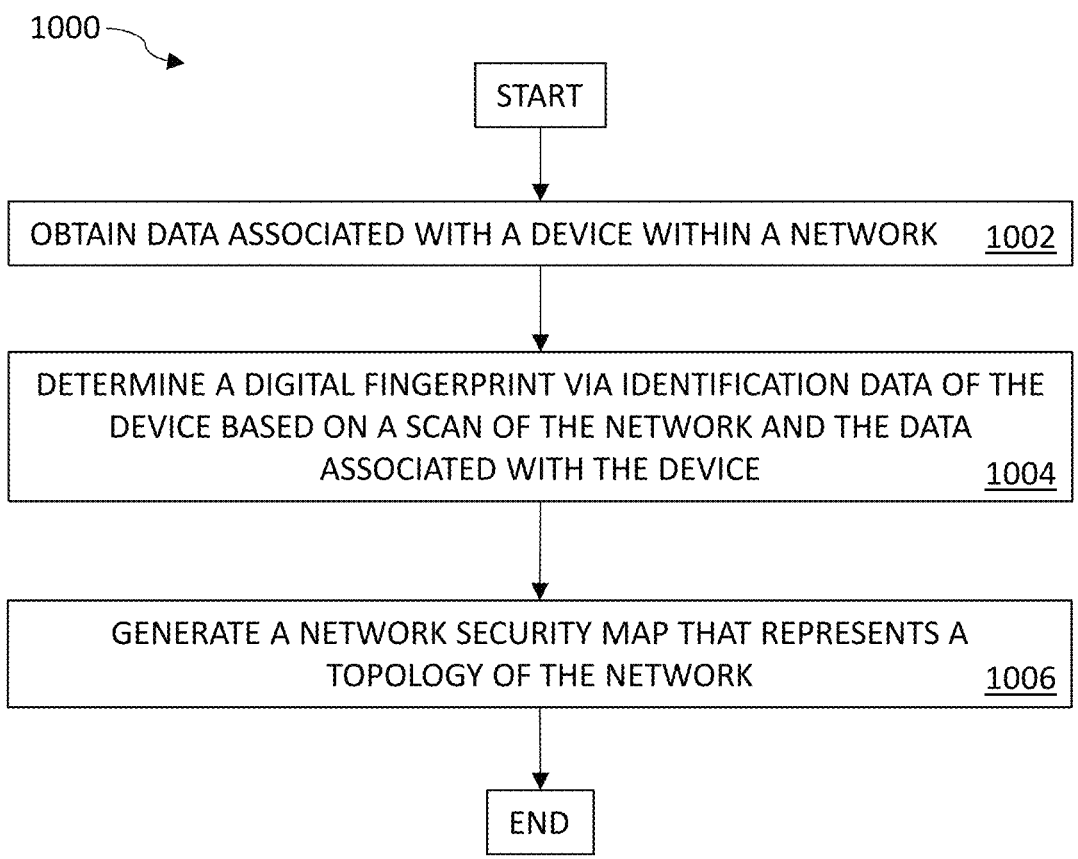
FIG. 10 is a flowchart depicting operational steps for generating a network security map that represents a topology of the network, in accordance with one or more embodiments of the present disclosure.

FIG. 10 is a flowchart 1000 depicting operational steps for generating a network security map that represents a topology of the network, in accordance with one or more embodiments of the present disclosure. In some embodiments, at least one processor of a computing device may perform the following steps, where the steps respectively correlate with 1002-1006 of FIG. 10. In step 1002, the at least one processor may obtain data associated with a device within a network. In step 1004, the at least one processor may determine digital fingerprint via identification data of the device based on a scan of the network and the data associated with the device by comparing the identification data of the device to a plurality of devices within the network; generating the unique identification code that uniquely identifies the device based on a similarity score for the device; and determining the unique identification code to the device based on the digital fingerprint. In step 1006, the at least one processor may generate a network security map that represents the topology of the network, where the network security map maps the device within the topology according to the unique identification code so as to facilitate causing at least one security action with respect to the device within the network.

At least some aspects of the present disclosure will now be described with reference to the following numbered clauses.

Clause 1. A computer-implemented method may include: obtaining, by a processor, data associated with a device within a network; determining, by the processor, a digital fingerprint via identification data of the device based on a scan of the network and data associated with the device by: comparing the identification data of the device to a plurality of devices within the, generating a unique identification code that uniquely identifies the device based on a similarity score for the device, and determining the unique identification code for the device based on the digital fingerprint; and generating, by the processor, a network security map that represents a topology of the network, where the network security map maps the device within the topology according to the unique identification code so as to facilitate causing at least one security action with respect to the device within the network.

Clause 2. The method according to clause 1, where the device is a host device capable of performing operations within the network.

Clause 3. The method according to clause 1 or 2, where the network includes a target network within a plurality of networks.

Clause 4. The method according to clause 1, 2 or 3, further including storing the identification of the device in a data repository.

Clause 5. The method according to clause 1, 2, 3 or 4, where the scan of the network includes a vulnerability analysis of the device and the plurality of devices within the network.

Clause 6. The method according to clause 1, 2, 3, 4 or 5, where the unique identification code is a digital fingerprint associated with the device.

Clause 7. The method according to clause 1, 2, 3, 4, 5 or 6, where the similarity score includes calculating a similarity score for the device based on an output of the scan of the device, where the output of the scan includes a value assigned to a plurality of features associated with the identification data of the device.

Clause 8. The method according to clause 1, 2, 3, 4, 5, 6 or 7, further including predicting identification data for the device by utilizing a trained machine learning module to analyze historical data within the network and the data associated with the device.

Clause 9. The method according to clause 1, 2, 3, 4, 5, 6, 7, or 8, where the trained machine learning module includes a trained encoder capable of: identifying a component-wise average of a plurality of features associated with the identification data for the device; and removing a duplicate unique identification code obtained within the scan.

Clause 10. The method according to clause 1, 2, 3, 4, 5, 6, 7, 8 or 9, further including calculating a criticality score of the device based on the identification data within the network.

Clause 11. The method according to clause 1, 2, 3, 4, 5, 6, 7, 8, 9 or 10, where the criticality score of the device is representative of a degree of importance to security of the network.

Clause 12. The method according to clause 1, 2, 3, 4, 5, 6, 7, 8, 9, 10 or 11, where the identification data includes a device category, where the device category is one of workstation, router, server, printer, camera, or a combination thereof.

Clause 13. The method according to clause 1, 2, 3, 4, 5, 6, 7, 8, 9, 10, 11 or 12, further including conducting the scan of the network and generating the similarity score are conducted repeatedly at a predetermined frequency.

Clause 14. The method according to clause 1, 2, 3, 4, 5, 6, 7, 8, 9, 10, 11, 12 or 13, further including calculating a device risk score for the device in the network based on a historical data associated within the network, a number of detected vulnerabilities within the network, and a criticality score of the device.

Clause 15. A computer-implemented method may include: obtaining, by a processor, data associated with a device within a network; predicting, by the processor, identification data for the device by utilizing a trained machine learning module to analyze historical data within the network and the data associated with the device; determining, by the processor, an identification data of the device based on a scan of the network and data associated with the device; comparing, by the processor, the identification data of the device to a plurality of devices within the network to generate a unique identification code based on a similarity score for the device; validating, by the processor, the identification data of the device based on the similarity score meeting a predetermined threshold; assigning, by the processor, the unique identification code to the device based on the validating of the identification data; and generating, by the processor, a network security map that represents a topology of the network, where the network security map maps the device within the topology according to the unique identification code so as to facilitate causing at least one security action with respect to the device within the network.

Clause 16. The method according to clause 15, where the device is a host device capable of performing operations within the network.

Clause 17. The method according to clause 15 or 16, where further including storing the identification of the device in a data repository.

Clause 18. The method according to clause 15, 16, or 17, where the scan of the network includes a vulnerability analysis of the device and the plurality of devices within the network.

Clause 19. The method according to clause 15, 16, 17, or 18, where the unique identification code is a digital fingerprint associated with the device.

Clause 20. The method according to clause 15, 16, 17, 18, or 19, where the similarity score includes calculating a similarity score for the device based on an output of the scan of the device, where the output of the scan includes a value assigned to a plurality of features associated with the information data of the device.

Clause 21. The method according to clause 15, 16, 17, 18, 19, or 20, where the trained machine learning module includes a trained encoder capable of: identifying a component-wise average of a plurality of features associated with the identification data for the device; and removing a duplicate unique identification code obtained within the scan.

Clause 22. The method according to clause 15, 16, 17, 18, 19, 20, or 21, further including a criticality score of the device based on the identification data within the network.

Clause 23. The method according to clause 15, 16, 17, 18, 19, 20, 21, or 22, where the criticality score of the device is representative of a degree of importance to security of the network.

Clause 24. The method according to clause 15, 16, 17, 18, 19, 20, 21, 22, or 23, further including conducting the scan of the network and generating the similarity score are conducted repeatedly at a predetermined frequency.

Clause 25. The method according to clause 15, 16, 17, 18, 19, 20, 21, 22, 23, or 24, further including calculating a device risk score for the device in the network based on a historical data associated within the network, a number of detected vulnerabilities within the network, and a criticality score of the device.

Clause 26. A system includes: a non-transient computer memory, storing software instructions; at least one processor of a computing device associated with a user; where, when the processor executes the software instructions, the computing device is programmed to: obtain data associated with a device within a network; predict identification data for the device by utilizing a trained machine learning module to analyze historical data within the network and the data associated with the device; determine an identification data of the device based on a scan of the network and data associated with the device; compare the identification data of the device to a plurality of devices within the network to generate a unique identification code based on a similarity score for the device; validate the identification data of the device based on the similarity score meeting a predetermined threshold; assign the unique identification code to the device based on the validating of the identification data; and generate a network security map that represents a topology of the network, where the network security map maps the device within the topology according to the unique identification code so as to facilitate causing at least one security action with respect to the device within the network.

Clause 27. The system according to clause 26, where the unique identification code is a digital fingerprint associated with the device.

Clause 28. The system according to clause 26 or 27, where the similarity score includes calculating a similarity score for the device based on an output of the scan of the device, where the output of the scan includes a value assigned to a plurality of features associated with the identification data of the device.

Clause 29. The system according to clause 26, 27, or 28, where the trained machine learning module includes a trained encoder capable of: identifying a component-wise average of a plurality of features associated with the identification data for the device; and removing a duplicate unique identification code obtained within the scan.

Clause 30. A system includes: a non-transient computer memory, storing software instructions; at least one processor of a computing device associated with a user; where, when the processor executes the software instructions, the computing device is programmed to: obtain data associated with a device within a network; determine a digital fingerprint via identification data of the device based on a scan of the network and the data associated with the device by: comparing the identification data of the device to a plurality of devices within the network, generating a unique identification code that uniquely identifies the device based on a similarity score for the device, and determining, the unique identification code to the device based on the digital fingerprint; and generate a network security map that represents a topology of the network, where the network security map maps the device within the topology according to the unique identification code so as to facilitate causing at least one security action with respect to the device within the network.

The present disclosure describes, in detail, systems and methods of utilizing a trained encoder to determine type data associated with each device within a plurality of devices within a network and automatically map a terrain of devices within the network based on each the type data of the plurality of devices. The following embodiments provide technical solutions and technical improvements over technical problems, drawbacks and/or deficiencies in the technical fields involving network security, digital fingerprinting, type labeling of devices, and network mapping. Specifically, a technological problem exists in merely determining a type for a host in a particular network at a particular time. Typically, a single configuration scan may provide information at the particular time of the scan, when, in actuality, the information may vary over time, especially when devices change physical and/or virtual location.

As explained in more detail below, technical solutions and technical improvements herein include aspects of improved technologies for utilizing a trained machine learning module to dynamically assign one or more unique identification codes to one or more devices within a network; calculating a confidence score for the codes assigned to one or more devices within the network; determining type information for the one or more devices based on the confidence score; and performing a security operation based on the type information. The trained machine learning module may be capable of making comparisons across a plurality of fields (e.g., operating systems) that identify devices and implicitly determine type information associated with each device. In certain embodiments, the trained machine learning module may refer to a plurality of logic trees capable of comparing unique identification codes and a plurality of features associated with each unique identification code for a plurality of devices to assign one or more type labels to each device. For example, these type labels associated with the type information (e.g., metadata) for each device may include work- station, server, router and/or switch (e.g., networking devices), printer and embedded system. In some embodiments, the unique identification code may refer to a digital fingerprint associated with each device. In some embodiments, each device may refer to a host computing device capable of performing operations within the network. The trained encoder may also generate one or more vectors associated with each unique identification code for a particular device. Each particular device may refer to a particular host device, such as a computing device, a server computing device, a workstation, a laptop, and/or a smartphone. In some embodiments, the trained machine learning module may utilize a semi-supervised model framework to predict type information for each device of the plurality of devices and may store the unique identification codes in an identification code database. In certain embodiments, the identification code database may refer to a data repository. The trained machine learning module may scan the plurality of devices to obtain type information data related to a particular unique identification code associated with each device and the plurality of features associated with the particular unique identification code. In certain embodiments, the output of the scan may result in labeled data and unlabeled data, where the labeled data may refer to a predicted and/or implicit type information. The unlabeled data may result in a lower confidence score of a plurality of host type predictions and may result in a second scan of the plurality of devices within the network. In certain embodiments, the trained machine learning module may require additional type information for implicit assignment of type labels to each device of the plurality of devices for subsequent scans of the plurality of devices within the network. In some embodiments, the trained machine learning module may augment scan data before assigning a digital fingerprint for each device of the plurality of devices. In conjunction with assigning the digital fingerprint to each device, the trained machine learning module may determine the type information of each device and assign a type label to each device based on the digital fingerprint. In certain embodiments, the output from the trained machine learning module may be sent to a user interface to display the determined type information for each device of the plurality of devices within the network. In some embodiments, the trained machine learning module may refer to a host type labeling model. In certain embodiments, the trained machine learning modules may be any supervised machine learning module used for multi-class classification. For example, the trained machine learning module may refer to a logistic regression model, a random forest model, and/or gradient boosting machines model. The calculation of a confidence score may predict an optimal vector value for a particular device by leveraging a weighting scheme to reduce a likelihood of significant misclassifications, where the confidence score associated with the particular device quantifies the likelihood that the prediction is a match to the predicted vector value (in this case, host type). In some embodiments, the trained machine learning module may communicate with a trained encoder to assign a digital fingerprint for each device, a prediction for type information for each device, and generate a type label for each device of the plurality of devices using both the digital fingerprints and plurality of type predictions. In some embodiments, a confidence score for a particular device may refer to a calculated cosine similarity between the predicted type information and the type information for a set of exemplar devices. In some embodiments, the trained machine learning module may store the plurality of type labels for each device of the plurality of devices associated with the confidence score exceeding a predetermined threshold of similarity. In certain embodiments, the predetermined threshold of similarity may refer to a value set for similarity scores to determine matches between at least two devices of the plurality of devices. In certain embodiments, the predetermined threshold of similarity may refer to a quantification of a degree of agreement between a host of a given type and a highest-ranked representative set of features for that given type.

In some embodiments, the present disclosure may optimize the comparison of the predicted type information and the determined type information based on an augmented scan of the plurality of devices. In certain embodiments, the data repository may contain a plurality of pre-generated type labels associated with the type information for each device. In some embodiments, a plurality of features within each digital fingerprint may be assigned a particular weight based on historical data and/or user input, where a weighted feature may modify the confidence score calculation. In certain embodiments, the plurality of features may refer to a host risk score, a number of detected vulnerabilities, a remediation rate, and a host type. In some embodiments, one or more processors of a computing device may perform similar functions of a trained machine learning module. In some embodiments, the machine learning module may be trained using historical digital fingerprints for the plurality of devices and historical type information associated with the historical digital fingerprints. In certain embodiments, the trained machine learning module may filter one or more type labels associated with a large collection of devices within a given network. The pre-generated type labels may refer to a collection of type labels associated with the plurality of devices, where each type label may refer to a particular function for a particular device. In some embodiments, the trained machine learning module may identify the plurality of features associated with the digital fingerprint associated with each device of the plurality of devices, predict the type information for each device, determine the type information associated with each device based on the digital fingerprint, compute the confidence score between the predicted type information and the determined associated with the particular device and the data embeddings associated with the plurality of devices, compare the calculated similarity score to the predetermined threshold of similarity to assign a type label to each device of the plurality of device in response to a confidence score that exceeds the threshold; and automatically map each device of the plurality of devices within the network. For example, the trained machine learning module may automatically map the plurality of devices within the network at a given time and dynamically track movement by the plurality of devices within the network. In certain embodiments, the trained machine learning module may ingest the results of a performed scan of the network.

In some embodiments, the output of the trained machine learning module may be sent to a device interface that may generate a device summary report, where the device summary report may provide a host risk score, a number of detected vulnerabilities, a remediation rate, and host IP information. In certain embodiments, the trained machine learning module may identify a particular device within the plurality of devices based on the digital fingerprint and dynamically predict the type information of the particular device based on the digital fingerprint. In certain embodiments and in response to an augmented scan of the plurality of devices within the network, the trained machine learning module may assign a type label to each device of the plurality of devices.

Figure 11:
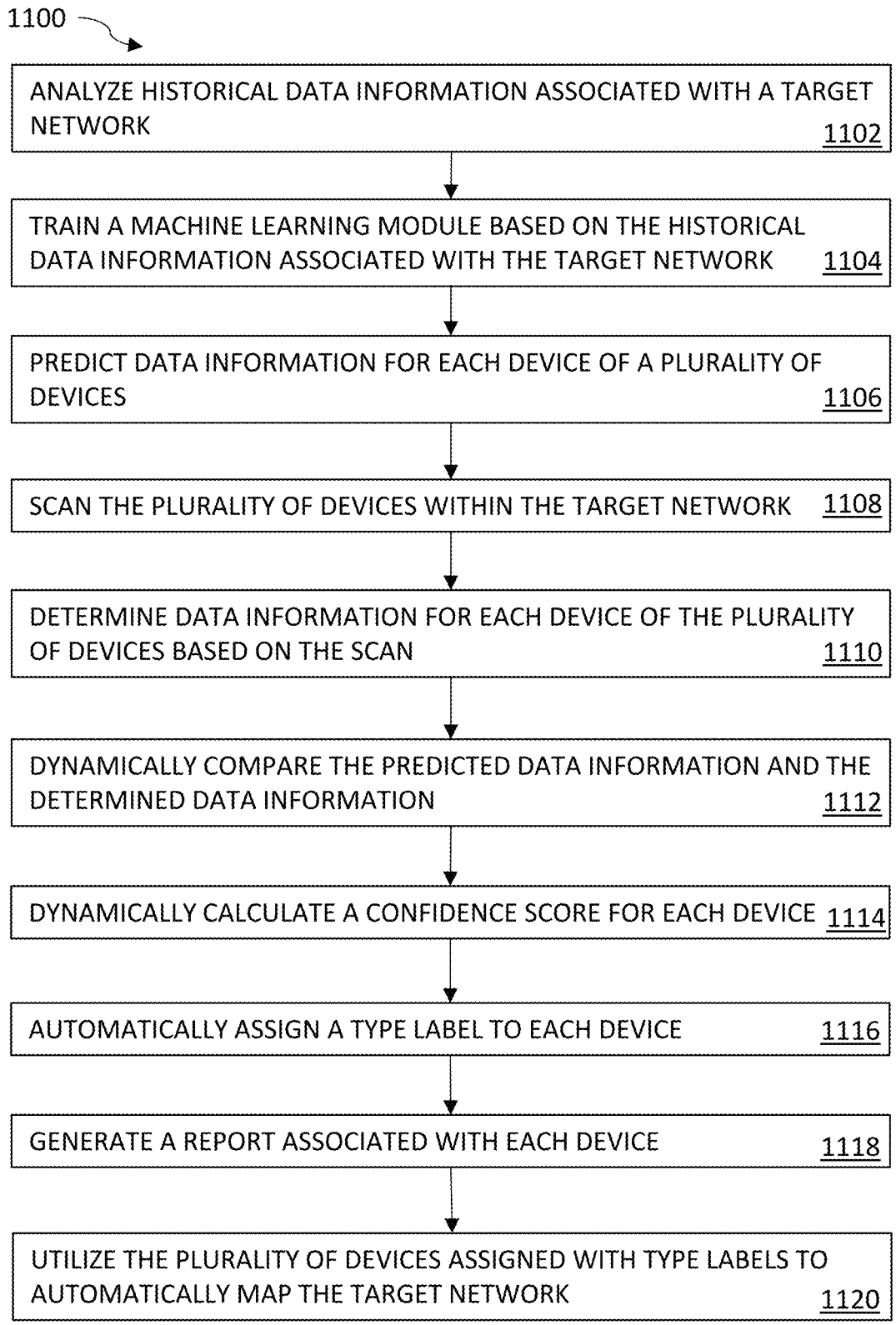
FIG. 11 is a flowchart illustrating operational steps for assigning a type label to one or more devices of the plurality of devices based on a calculated confidence score between the predicted type information and the determined type information, in accordance with one or more embodiments of the present disclosure.

FIG. 11 is a flowchart 1100 depicting operational steps for assigning a type label to one or more devices of the plurality of devices based on a calculated confidence score between the predicted type information and the determined type information. In some embodiments, at least one processor of a computing device may perform the following steps, where the steps respectively correlate with 1102-1120 of FIG. 11. In step 1102, the at least one processor may analyze historical data information associated with the target network. In step 1104, the at least one processor may train a machine learning module based on the historical data information associated with the target network. In step 1106, the at least one processor may predict data information for each device of a plurality of devices within the target network. In step 1108, the at least one processor may scan the plurality of devices within the network to obtain metadata for each device. In step 1110, the at least one processor may determine data information for each device of the plurality of devices based on the scan. In step 1112, the at least one processor may dynamically compare the predicted data information and the determined data information for each device of the plurality of devices. In step 1114, the at least one processor may dynamically calculate a confidence score for each device based on a comparison of the predicted data information and the determined data information. In step 1116, the at least one processor may automatically assign a type label to each device in response to the confidence score for a particular device exceeding a predetermined threshold of similarity, where the type label provides a description of the metadata associated with the particular device. In step 1118, the at least one processor may generate a report associated with each device of the plurality of devices assigned a type label for subsequent scans of the target network. In step 1120, the at least one processor may utilize the plurality of devices assigned with type labels to automatically map the target network 102.

In some embodiments, the historical data information may refer to a digital fingerprint and/or any software functions being performed by the device to efficiently identify each device of the plurality of devices within the target network 102. In some embodiments, the metadata for each device may include the device IP address, a host name, one or more MAC address(es), a detected operating system, and one or more detected service(s). In some embodiments, the calculated confidence score may aggregate a value of an existing type information and a value associated with a non-existing type information and aggregate the two values. In certain embodiments, the aggregate of the two values may refer to a value associated with a max confidence value associated with the type information. The predicted type information may refer to a determination based on the digital fingerprint of the device and the metadata associated with that particular digital fingerprint. In certain embodiments, the determination of the type information in response to the scan may refer to a verification of the predicted type information to optimize the training of the machine learning module. In some embodiments, the trained machine learning module may perform the steps 1102-1120 of FIG. 11.

Figure 12:
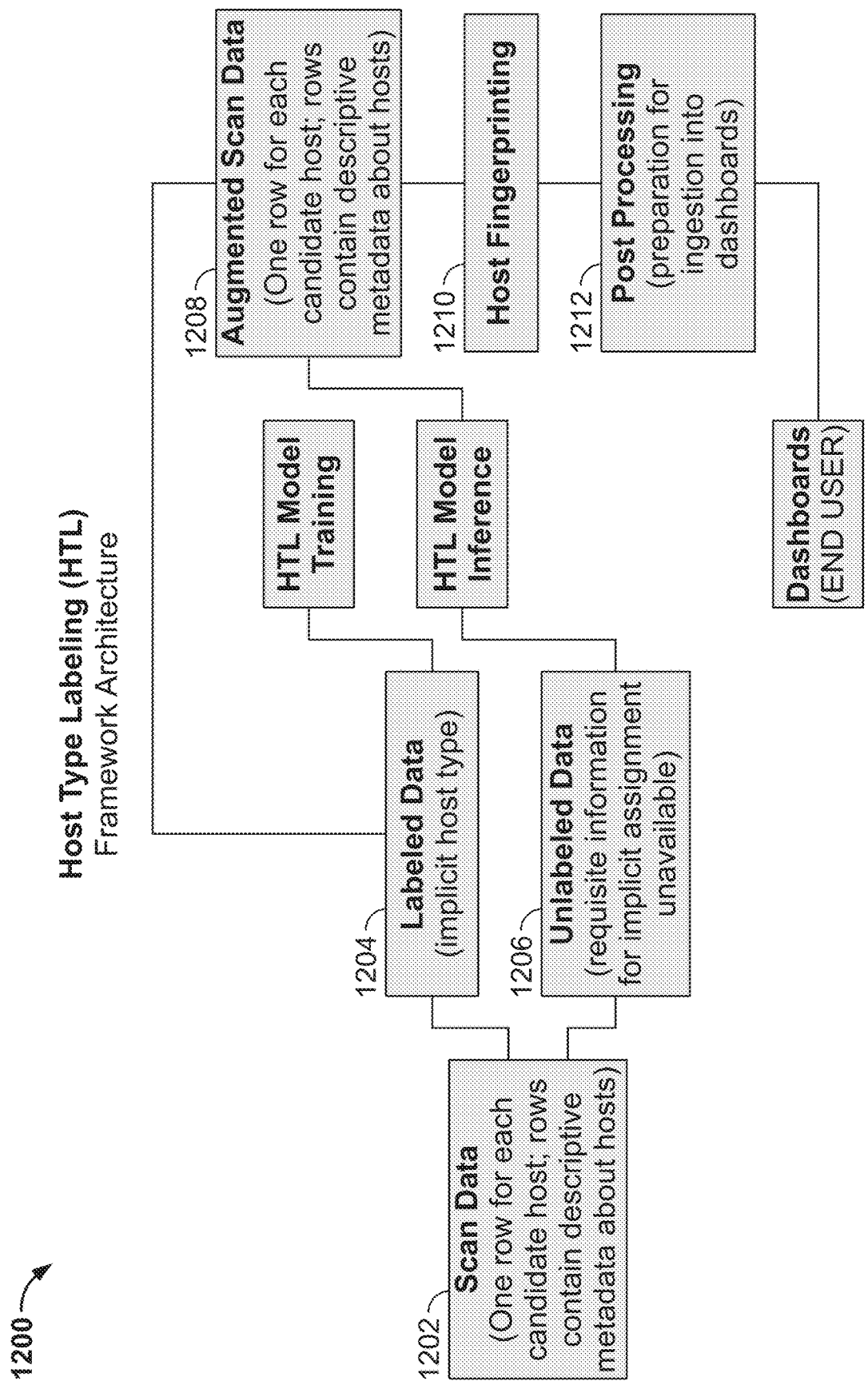
FIG. 12 depicts a block diagram of the trained machine learning module, in accordance with one or more embodiments of the present disclosure.

FIG. 12 depicts a block diagram 1200 of the trained machine learning module, in accordance with one or more embodiments of the present disclosure. In FIG. 12, the trained machine learning module may identify scan data 1202 associated with the plurality of devices within the target network 102. In some embodiments, the trained machine learning module may sort the scan data 1202 into a labeled database 1204 and an unlabeled database 1206, where the labeled database 1204 stores predicted data types for the plurality of devices and the unlabeled database 1206 stores data information for the plurality of devices that fails to meet the predetermined threshold of similarity and remains unlabeled. In certain embodiments, the unlabeled data may require an augmented scan. In some embodiments, the trained machine learning module may utilize the labeled data as input data for training. In some embodiments, the trained machine learning module may utilize the unlabeled data as input data for an augmented scan of the plurality of devices. In some embodiments, the trained machine learning module may generate predictions for the unlabeled data without additional input(s). In some embodiments, the output of the augmented scan of the plurality of devices may refer to augmented scan data 1208. In some embodiments, the trained machine learning module may utilize a trained encoder to assign digital fingerprints 1210 to each device based on the augmented scan data 1208. In some embodiments, the trained machine learning module may assign one or more type labels 1212 as a process in response to the assignment of digital fingerprints 1210 to each device. In some embodiments, the trained machine learning module may display the assigned one or more type labels 1212 via a user interface to automatically map the target network 102.

Figure 13:
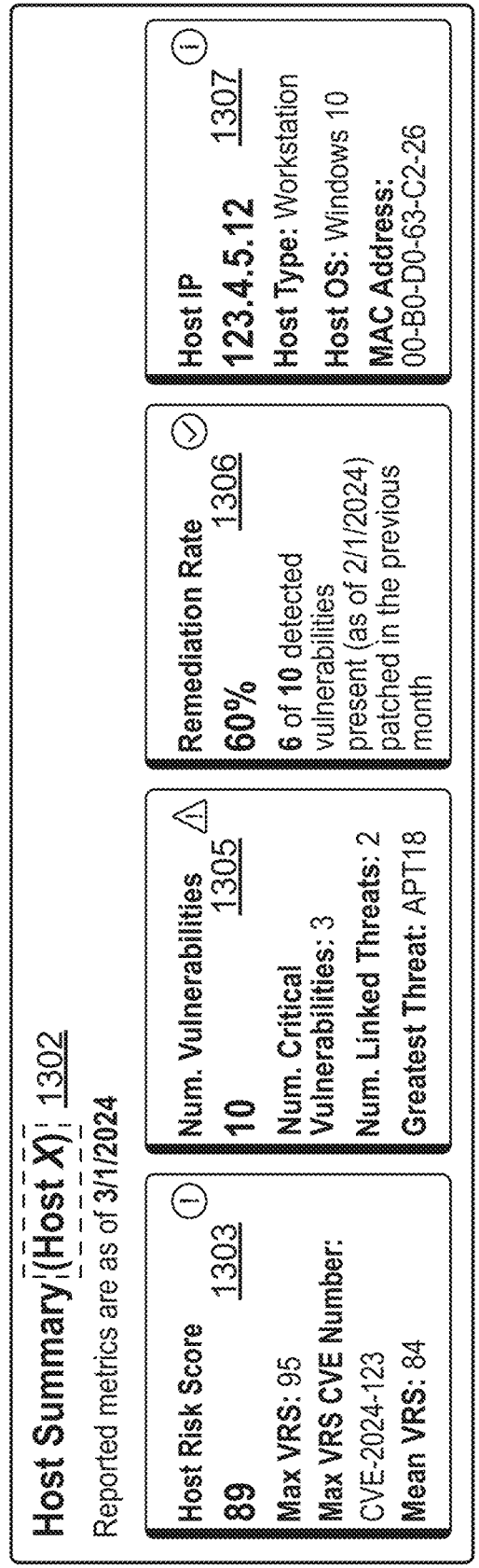
FIG. 13 depicts a block diagram of an exemplary computer-based system/platform in accordance with one or more embodiments of the present disclosure.

FIG. 13 depicts an example output 1300 of the trained machine learning module based on the scans of the plurality of devices within the target network 102, specifically the comparison of the predicted type information and the determined type information. The output of the trained machine learning module may display, via a user interface, a device summary report 1302. In the device summary report 1302, a host risk score 1303, a number of detected vulnerabilities 1305, a remediation rate 1306, and a device IP information 1307 may be displayed via the user interface.

Figure 14:
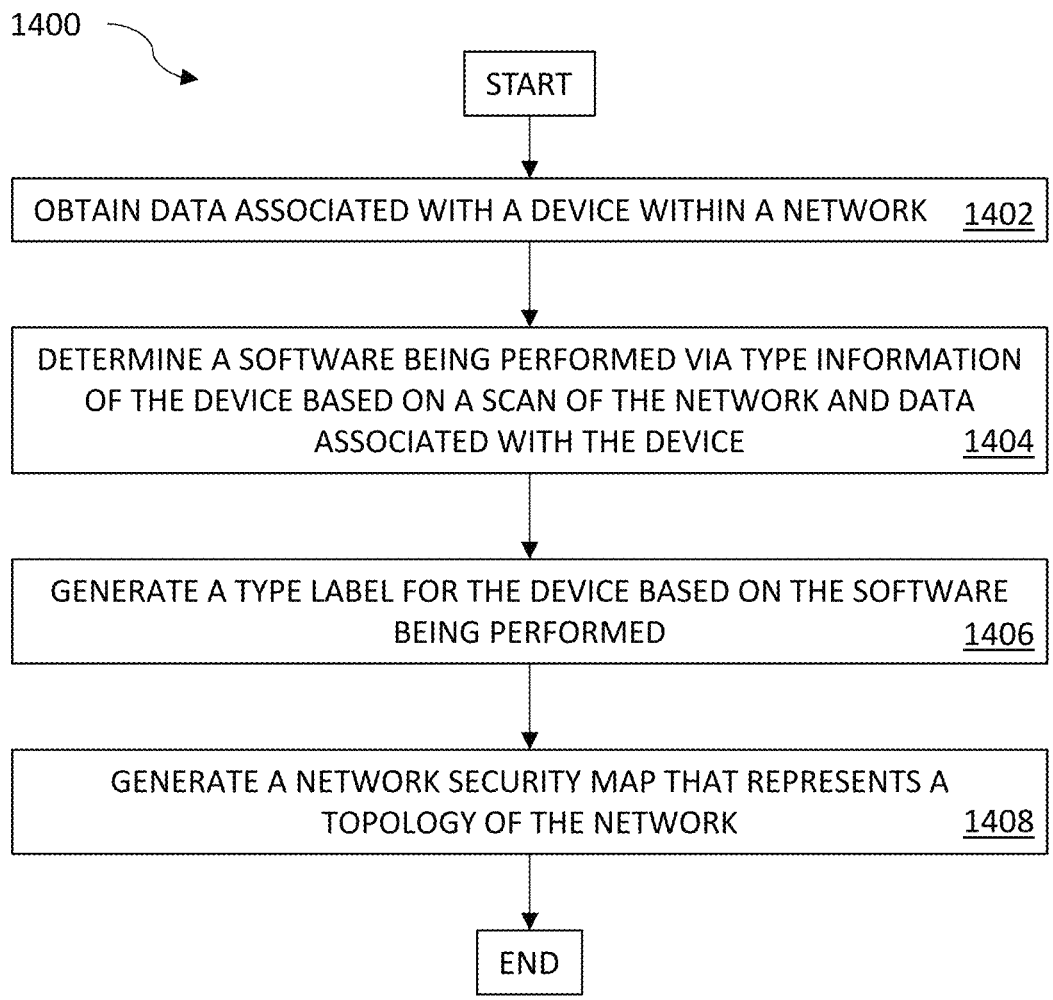
FIG. 14 is a flowchart depicting operational steps for generating a network security map that represents a topology of the network, in accordance with one or more embodiments of the present disclosure.

FIG. 14 is a flowchart 1400 depicting operational steps for generating a network security map that represents a topology of the network, in accordance with one or more embodiments of the present disclosure. In some embodiments, at least one processor of a computing device may perform the following steps, where the steps respectively correlate with 1402-1408 of FIG. 14. In step 1402, the at least one processor may obtain data associated with a device within a network. In step 1404, the at least one processor may determine installed software via type information on the device based on a scan of the network and the data associated with the device. In step 1406, the at least one processor may generate a type label for the device based on the detected software by comparing the type information of the device to a plurality of devices within the network to generate a confidence score for the device; grouping the type information of the device based on the confidence score meeting and/or exceeding a predetermined threshold; and determining the type label for the device based on the grouping of the type information. In step 1408, the at least one processor may generate a network security map that represents the topology of the network, where the network security map maps the device within the topology according to the type label so as to facilitate causing at least one security action with respect to the device within the network.

At least some aspects of the present disclosure will now be described with reference to the following numbered clauses.

Clause 1. A computer-implemented method may include: obtaining, by a processor, data associated with a device within a network; determining, by the processor, a software being performed via type information of the device based on a scan of the network and data associated with the device; generating, by the processor, a type label for the device based on the installed software by: comparing the type information of the device to a plurality of devices within the network to generate a confidence score for the device; grouping the type information of the device based on the confidence score meeting a predetermined threshold; and determining the type label for the device based on of the grouping of the type information; and generating, by the processor, a network security map that represents a topology of the network, where the network security map maps the device within the topology according to the type label so as to facilitate causing at least one security action with respect to the device within the network.

Clause 2. The method according to clause 1, where the data includes an active internet protocol address within a range associated with the device.

Clause 3. The method according to clause 1 or 2, where the network includes a target network within a plurality of networks.

Clause 4. The method according to clause 1, 2 or 3, where the scan of the network includes a vulnerability analysis of the device and the plurality of devices within the network.

Clause 5. The method according to clause 1, 2, 3 or 4, where the scan of the network includes an availability analysis of the device and the plurality of devices within the network.

Clause 6. The method according to clause 1, 2, 3, 4 or 5, where the type information of the device includes metadata related to each device and software being performed by the device.

Clause 7. The method according to clause 1, 2, 3, 4, 5 or 6, where the confidence score includes calculating a confidence score for the device based on an output of the scan of the device, where the output of the scan includes a value assigned to a plurality of features associated with the type information of the device.

Clause 8. The method according to clause 1, 2, 3, 4, 5, 6 or 7, further including predicting type information for the device by utilizing a trained machine learning module to analyze historical data within the network and the data associated with the device.

Clause 9. The method according to clause 1, 2, 3, 4, 5, 6, 7, or 8, where the trained machine learning module includes a trained encoder capable of dynamically tracking modifications to the data associated with the device.

Clause 10. The method according to clause 1, 2, 3, 4, 5, 6, 7, 8 or 9, further including calculating a criticality score of the device based on the type information within the network.

Clause 11. The method according to clause 1, 2, 3, 4, 5, 6, 7, 8, 9 or 10, where the criticality score of the device is representative of a degree of importance to security of the network.

Clause 12. The method according to clause 1, 2, 3, 4, 5, 6, 7, 8, 9, 10 or 11, where the type information includes a device category, where the device category is one of workstation, router, server, printer, camera, or a combination thereof.

Clause 13. The method according to clause 1, 2, 3, 4, 5, 6, 7, 8, 9, 10, 11 or 12, further including conducting the scan of the network and generating the confidence score are conducted repeatedly at a predetermined frequency.

Clause 14. The method according to clause 1, 2, 3, 4, 5, 6, 7, 8, 9, 10, 11, 12 or 13, further including calculating a device risk score for the device in the network based on a historical data associated within the network, a number of detected vulnerabilities within the network, and a criticality score of the device.

Clause 15. A computer-implemented method may include: obtaining, by a processor, data associated with a device within a network; predicting, by the processor, type information for the device by utilizing a trained machine learning module to analyze historical data within the network and the data associated with the device; determining, by the processor, type information of the device based on a scan of the network and predicted type information data associated with the device; comparing, by the processor, the type information of the device to a plurality of devices within the network to generate a confidence score for the device; validating, by the processor, the type information of the device based on the confidence score meeting a predetermined threshold; assigning, by the processor, a type label to the device based on the validating of the type information; and generating, by the processor, a network security map that represents a topology of the network, where the network security map maps the device within the topology according to type label so as to facilitate causing at least one security action with respect to the device within the network.

Clause 16. The method according to clause 15, where the data includes an active internet protocol address within a range associated with the device.

Clause 17. The method according to clause 15 or 16, where the scan of the network includes a vulnerability analysis of the device and the plurality of devices within the network.

Clause 18. The method according to clause 15, 16, or 17, where the scan of the network includes an availability analysis of the device and the plurality of devices within the network.

Clause 19. The method according to clause 15, 16, 17, or 18, where the type information of the device includes metadata related to each device and software being performed by the device.

Clause 20. The method according to clause 15, 16, 17, 18, or 19, where the confidence score includes calculating a confidence score for the device based on an output of the scan of the device, where the output of the scan includes a value assigned to a plurality of features associated with the type information of the device.

Clause 21. The method according to clause 15, 16, 17, 18, 19, or 20, where the trained machine learning module includes a trained encoder capable of dynamically tracking modifications to the data associated with the device.

Clause 22. The method according to clause 15, 16, 17, 18, 19, 20, or 21, further including a criticality score of the device based on the type information within the network Clause 23. The method according to clause 15, 16, 17, 18, 19, 20, 21, or 22, where the criticality score of the device is representative of a degree of importance to security of the network.

Clause 24. The method according to clause 15, 16, 17, 18, 19, 20, 21, 22, or 23, further including conducting the scan of the network and generating the confidence score are conducted repeatedly at a predetermined frequency.

Clause 25. The method according to clause 15, 16, 17, 18, 19, 20, 21, 22, 23, or 24, further including calculating a device risk score for the device in the network based on a historical data associated within the network, a number of detected vulnerabilities within the network, and a criticality score of the device.

Clause 26. A system includes: a non-transient computer memory, storing software instructions; at least one processor of a computing device associated with a user; where, when the processor executes the software instructions, the computing device is programmed to: obtain data associated with a device within a network; predict type information for the device by utilizing a trained machine learning module to analyze historical data within the network and the data associated with the device; determine type information of the device based on a scan of the network and data associated with the device; compare the type information of the device to a plurality of devices within the network to generate a confidence score for the device; validate the type information of the device based on the confidence score meeting a predetermined threshold; assign a type label to the device based on the validating of the type information; and utilize an assigned type label and the historical data to automatically map a terrain of the network.

Clause 27. The system according to clause 26, where the type information of the device includes metadata related to each device and software being performed by the device.

Clause 28. The system according to clause 26 or 27, where the confidence score includes calculating a confidence score for the device based on an output of the scan of the device, where the output of the scan includes a value assigned to a plurality of features associated with the type information of the device.

Clause 29. The system according to clause 26, 27, or 28, where the trained machine learning module includes a trained encoder capable of dynamically tracking modifications to the data associated with the device.

Clause 30. A system includes: a non-transient computer memory, storing software instructions; at least one processor of a computing device associated with a user; where, when the processor executes the software instructions, the computing device is programmed to: obtain data associated with a device within a network; determine a software being performed via type information of the device based on a scan of the network and data associated with the device; generate a type label for the device based on the software being performed by: compare the type information of the device to a plurality of devices within the network to generate a confidence score for the device, group the type information of the device based on the confidence score meeting a predetermined threshold; and determine the type label for the device based on of the grouping of the type information; and generate a network security map that represents a topology of the network, where the network security map maps the device within the topology according to the type label so as to facilitate causing at least one security action with respect to the device within the network.

The present disclosure describes an automated key terrain identification process that may be included as a component in the analytics applications 130. The term "key terrain" as used herein, can generally refer to specific hosts deemed to be critical to the overall operation of a network. Additionally, "host criticality" may be defined as how critical a given host is in reference to the overall operation of a network, and the quantitative Host Criticality Score (HCS) described herein may generally be used to automatically identify "key terrain".

The HCS may have a value in a predetermined range (e.g., between 1 and 100) that quantifies host criticality with respect to a number of components including but not limited to:

- Host Type representing the role, function or classification of each host
- Number of services running on each host
- Business Use/Mission Criticality
- Inferred/Mapped Functionality The term, "inferred functionality" as described herein generally refers to the process of using computational methods to deduce the role a host plays within a network based on observed characteristics of that host. The challenge in network inference lies in the high uncertainty and the potential for false positives and negatives. Validating such inferences requires robust methods, and researchers often rely on assortativity coefficients or other metrics to compare different inference algorithms.

The term, "mapped functionality" as described herein generally refers to using human-curated mappings from host(s) to function(s) that the host(s) support on the network.

The equation below may be an exemplary formula for calculating HCS:

$$HCS = HCS_{min}(T) \times SF_T(X) \quad \text{Eq. 1}$$

where,

T: Host Type (e.g., server, router, workstation)
X: Host Features (vector)
$HCS_{min}(T)$: Minimum HCS for a given host type T
$SF_T(X)$: Scaling function for a given host type T Hosts of a given type (referred to as "host type" herein) generally perform specific functions in support of network operations irrespective of what may be taking place on a network. For example, a router handles traffic between a large number of hosts, enabling those hosts to perform host-specific operations; and a printer can often only accept requests from a limited number of hosts (e.g., workstations near the physical location of the printer). Therefore, a router may be more critical than a printer to the network operations. Allowed ranges for host criticality scores for each unique host type T may be defined based on this assumption.

For a given host type T, HCS may vary between a defined minimum and maximum value to reflect their expected relative importance. These values may be determined empirically or set manually by the user. For example, the user may decide that the allowed ranges per host type are:

- Server: varies from 75 to 100
- Router: varies from 50 to 100
- Workstation: varies from 33 to 65
- Embedded: varies from 33 to 65
- Printer: varies from 1 to 40

In Eq. 1 for HCS:

$HCS_{min}(T)$: minimum HCS for a given host type T (e.g., 75 for servers in the above example).

A scaling function, $SF_T(X)$, may be defined for each host type T. The scaling functions encode variability in criticality for each host type T as a function of descriptive features, X.

An exemplary set of constraints on the form of $SF_T(X)$ are as follows:

The range of $SF_T(X)$ may be determined by minimum/maximum allowed HCS for host type T. For example, the range may be:

[1, {$HCS_{max}(T) - HCS_{min}(T)$}/$HCS_{min}(T)$] if $HCS_{min}(T) \neq 1$.

[1, $HCS_{max}(T)$] if $HCS_{min}(T) == 1$.

Referring to the previous example:

HCS for servers may vary between 75 [$HCS_{min}(T)$] and 100 [$HCS_{max}(T)$].

The allowed range for the scaling function is: [1, (100−75)/75]=[1, 1.333].

The functional form of $SF_T(X)$ may vary for each T as long as it possesses the following asymptotic behavior:

$SF_T(X) = 1$ if no descriptive features available (X may be null)

$SF_T(X)$ asymptotes at the maximum value in range

Bounds HCS to the desired range (1 to 100).

Implies that there may be a point at which HCS should be maxed out even if other amplifying information may be taken into account.

$SF_T(X)$ may be defined as the product of component-specific scaling functions.

For example, if information on the number of services, mission criticality, and inferred functionality is available:

X={Features for Services, Business Use/Mission Criticality, Inferred Functionality}

$SF_T(X) = SF_{T, SERVICES}(X) \times SF_{T, CRITICALITY}(X) \times SF_{T, FUNCTIONALITY}(X)$ Component-specific scaling functions are defined such that the overall scaling function, $SF_T(X)$, may be unaffected if features for a given component are not available.

For example, the number of services known to be running on a host may be taken as input to the scaling function for a given host type T. The motivation for this component may be that more services is likely (positively) correlated with the exemplar definition of host criticality.

The functional forms of $SF_{T, SERVICES(X)}$ may be set by the user or determined empirically.

Functional families include but are not limited to:

- Uniform
- Linear
- Power (decimal root)
- Exponential

To determine the appropriate functional form for the scaling function empirically given a large network with many hosts, one might:

- Calculate the number of services running on each host
- Construct a probability distribution function (PDF) (histogram) of the number of services for all hosts.
- Use the form of the PDF to inform the functional family:
  - Single-Valued PDF→Uniform $SF_{T, SERVICES}(X)$
  - Uniform PDF→Linear $SF_{T, SERVICES}(X)$
  - Skewed Left→Power $SF_{T, SERVICES}(X)$ The nature of the work being conducted on a given host may be another dimension of host criticality. In commercial settings, for example, business use and/or department (e.g., HR, Sales, IT) may influence host criticality.

As another example, in a setting where networks support military operations, specific missions may be mapped to host criticality (as a function of what operations and/or initiatives the missions support).

The functional forms of $SF_{T, CRITICALITY}(X)$ may be set by the user or determined empirically and must be determined by the nature of the data available.

Software installed or running on a given host can provide another quantifiable component of criticality. For example, consider a database server and an authentication server:

The database server runs software (e.g., Microsoft SQL Server) indicating it may be used to host a database that may be used by other hosts on the network.

The authentication server runs software (e.g., Microsoft Active Directory) used to ensure secure connections may be made between hosts on the network.

Even if both servers are managed by the same department (e.g., IT), the software running on each host may be a clear signature of a particular type of functionality, and in turn, that inferred functionality correlates with host criticality.

Quantifying how this component contributes to host criticality, and more directly, $SF_{T, FUNCTIONALITY(X)}$, may include:

Defining a class of functionalities (e.g., database server, authentication server)

Building a map from instances of software to functionalities

Quantifying how each functionality contributes to criticality

Defining the functional form of the scaling function that accepts those values as input While it is possible to calculate host criticality in an automated fashion using the proposed method, users may also wish to provide their own measures of criticality to influence the final host criticality score.

Consider, for example, two database servers running on different hosts with (1) exactly the same services and (2) managed by the same department:

DB Server #1: Manages critical data for a hosted application

DB Server #2: Manages account information for users with access to a hosted application If DB Server #1 goes down and the data stored on the server has not been replicated, the hosted application may be no longer functional.

If DB Server #2 goes down, user accounts will need to be recreated, but the critical data will not be lost, and the hosted application will still be functional.

If there is no other information to differentiate between DB Servers #1 and #2, the user-provided information about the nature of the databases hosted on each server may be used to "break the tie" in HCS.

Host criticality scores may be used to automatically identify "key terrain" (i.e., critical hosts) on a network. Example uses of host criticality scores include:

Patch managers prioritize vulnerabilities that may be exploitable on critical hosts irrespective of the CVSS score.

Network administrators overlay host risk scores and transfer critical operations away from hosts with high host risk score AND host criticality score.

If host criticality scores are generated for a sensitive network that supports military operations, defensive cyber analysts look at how bad actors may gain access to/move about the network if they were to target "key terrain" (may also inform sensor placement, firewalls to proactively improve defensive posture).

FIGS. 15-18 show exemplary elements of dashboard 140 that displays information about vulnerabilities present on a target network, hosts on the network, and an overall summary of the network.

Figure 15:
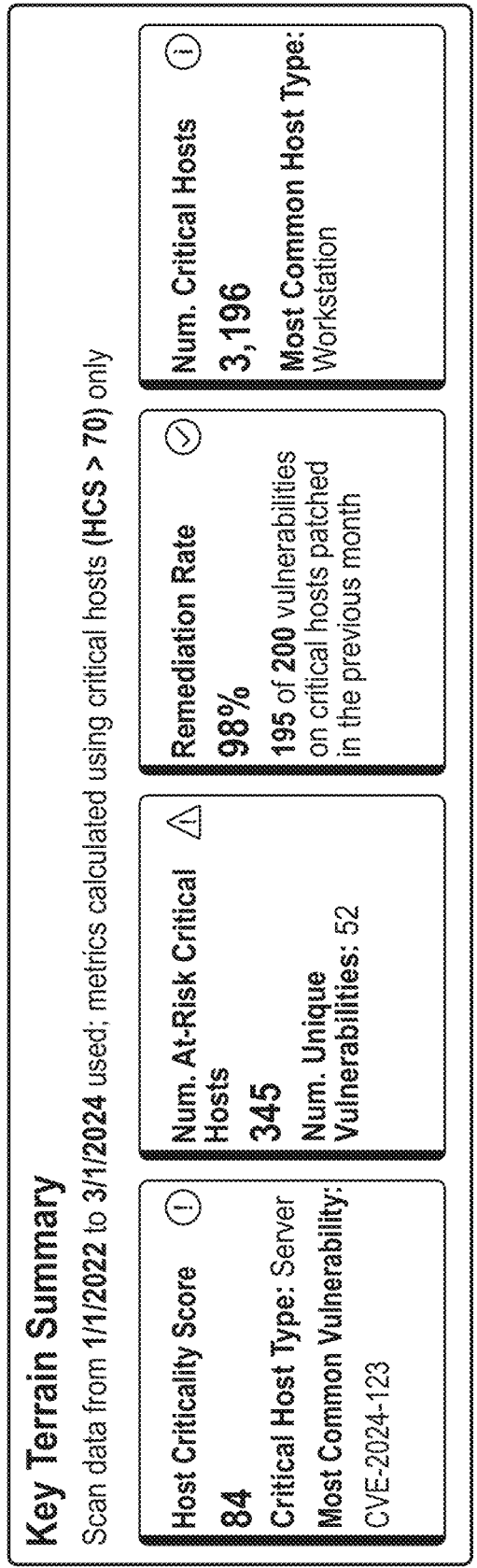
FIG. 15 shows a dashboard element that contains metrics calculated for "key terrain" over a period of time.

FIG. 15 shows a dashboard element 1500 that contains metrics calculated for "key terrain" over a period of time. The metrics include host criticality score, number of at-risk critical hosts, remediation rate, and number of critical hosts. Users of the presently disclosed network characterization and management system may review results of the automated key terrain identification in the dashboard to rapidly identify and rectify vulnerabilities present on critical hosts.

Figure 16:
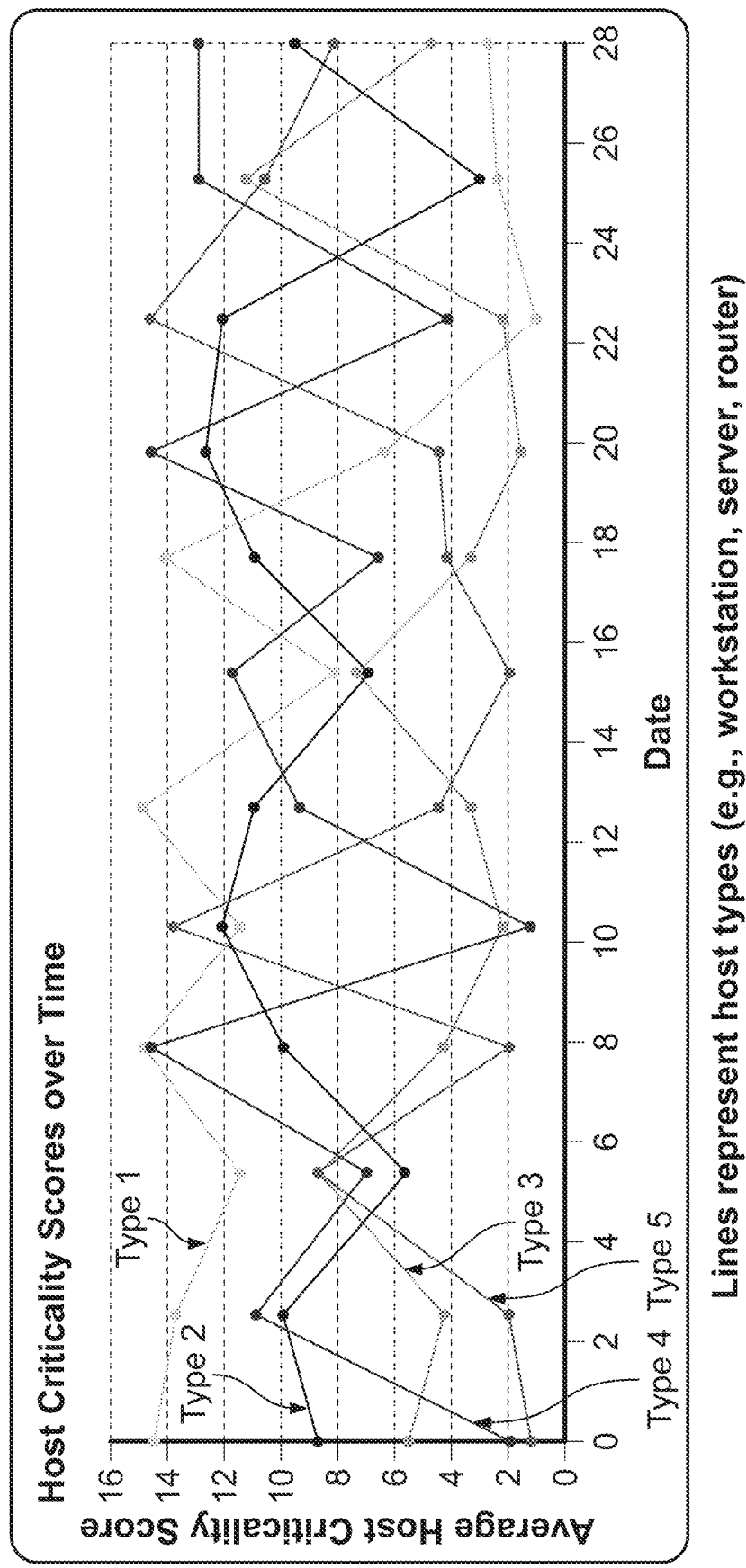
FIG. 16 is a line chart displaying a host criticality score over time for selected host types (e.g., workstation, server, router).

FIG. 16 is a line chart displaying a host criticality score over time for selected host types (e.g., workstation, server, router). Data used to determine host criticality scores may be embedded in the line chart (available by clicking on points) or in another dashboard element.

Figure 17:
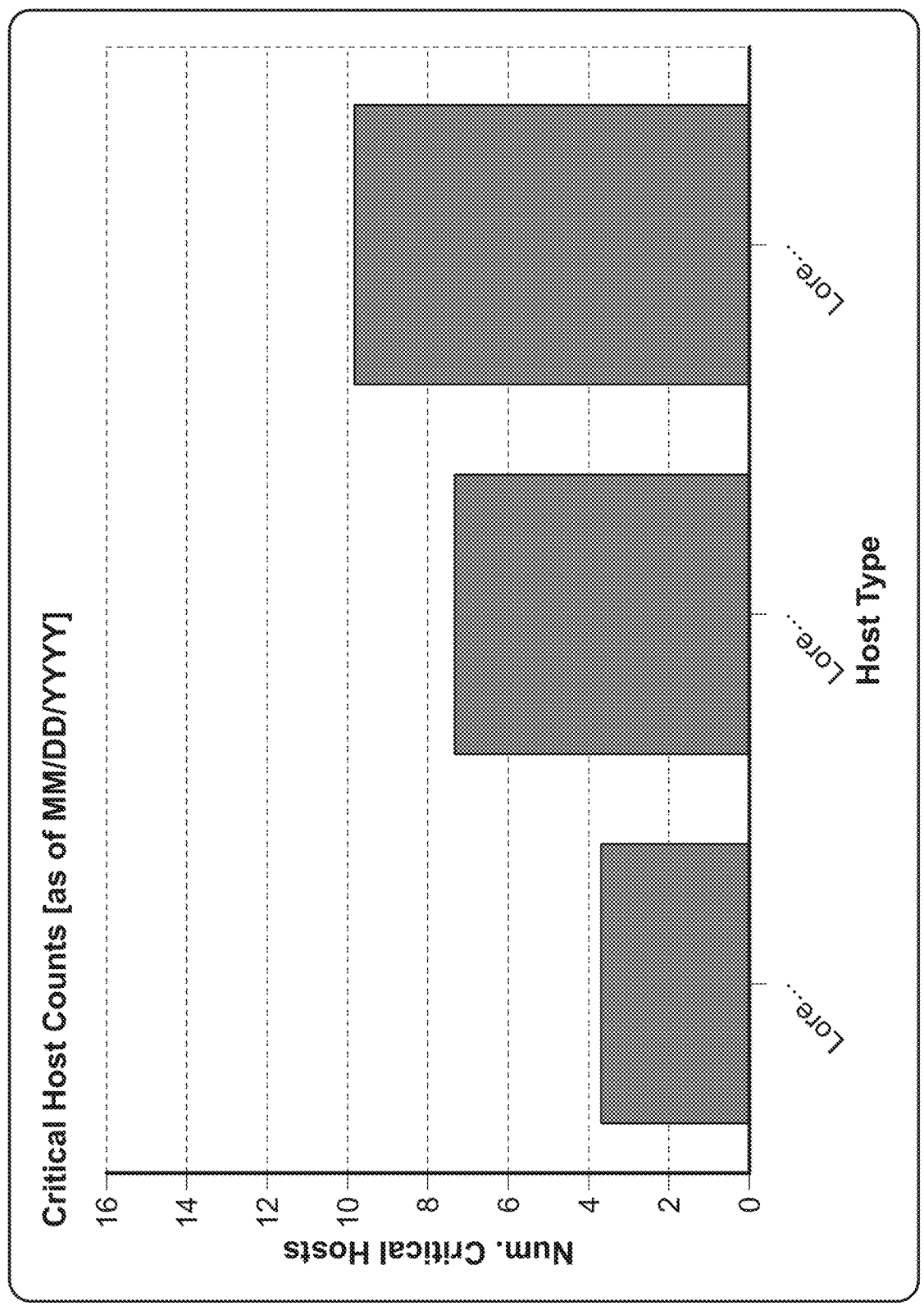
FIG. 17 shows a bar chart displaying the number of critical hosts vs. host types.

FIG. 17 shows a bar chart displaying the number of critical hosts vs. host types.

FIG. 18 shows a table displaying various host type related information, such as host type confidence, host criticality score and host risk score, that the presently disclosed network characterization and management system may utilize to prioritize patch management and/or proactively improve cyber defense posture.

In some embodiments, a computer-implemented method includes obtaining, by a computing device, a criticality score for each of a first and second host in a computer network, where obtaining the criticality score including: scanning, by the computing device, a host in a network to obtain type information of the host, a number of services running on the host, a functionality of the host, and a use case of the host; running, by the computing device, a machine learning model on the type information of the host to extract a minimum host criticality score; determining, by the computing device, a scaling factor based on the number of services running on the host, the functionality of the host, and the use case of the host; and calculating, by the computing device, the criticality score of by applying the scaling factor to the minimum host criticality score; and applying, by the computing device, a security patch on the first host prior to the second host when the criticality score of the first host may be higher than the criticality score of the second host.

In some embodiments, the criticality score may be obtained repeatedly over time from the network to monitor changes to network operation.

Figure 19:
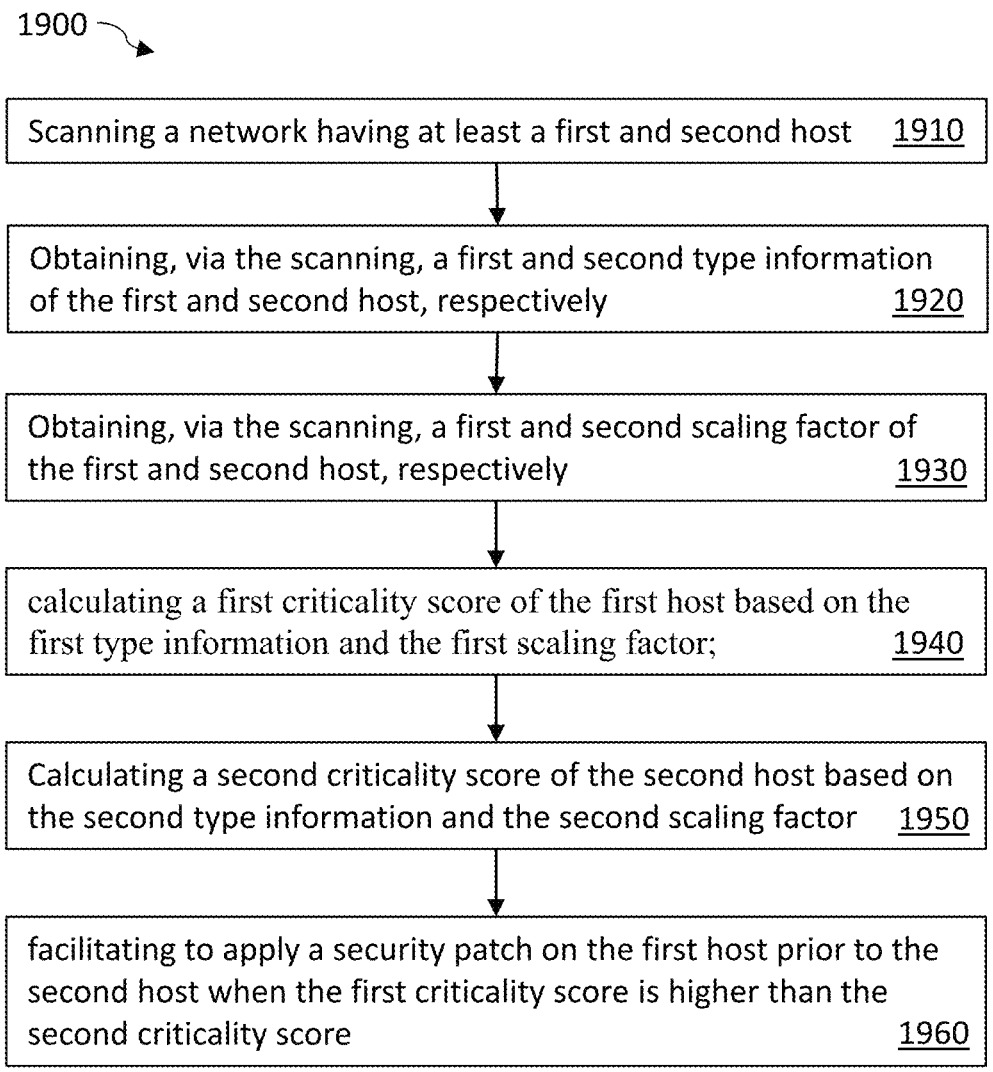
FIG. 19 is a flowchart illustrating an exemplary computer network management process in accordance with one or more embodiments of the present disclosure.

FIG. 19 is a flowchart illustrating an exemplary computer network management process 1900 in accordance with one or more embodiments of the present disclosure. The steps shown in FIG. 19 can be performed by any suitable computer-executable code and/or computing system, including system 100 shown in FIG. 1, and/or variations or combinations of one or more of the same. In one example, each of the steps shown in FIG. 19 can represent an algorithm whose structure includes and/or is represented by multiple sub-steps, examples of which will be provided in greater detail below.

In step 1910, a computing device scans a network having at least a first and second host.

In step 1920, the computing device obtains, via the scanning, a first and second type information of the first and second host, respectively. In some embodiments, the first or second type information includes a device category the first or second host belongs to. In some embodiments, the device category is one of workstation, router, server, printer, camera or a combination thereof.

In step 1930, the computing device obtains, via the scanning, a first and second scaling factor of the first and second host, respectively. In some embodiments, the first or second scaling factor is determined by a number of services running on the respective host, a functionality of the respective host, and a use case of the respective host.

In step 1940, the computing device calculates a first criticality score of the first host based on the first type information and the first scaling factor. In some embodiments, the first criticality score is a product of multiplying the first type information and the first scaling factor. In some embodiments, calculating the first criticality score involves using, as a multiplication factor, a minimum value for the device category of the first type information.

In step 1950, the computing device calculates a second criticality score of the second host based on the second type information and the second scaling factor. In some embodiments, the second criticality score is a product of multiplying the second type information and the second scaling factor. In some embodiments, calculating the second criticality score involves using, as a multiplication factor, a minimum value for the device category of the second type information.

In step 1960, the computing device facilitates to apply a security patch on the first host prior to the second host when the first criticality score is higher than the second criticality score.

In some embodiments, the process 1900 repeats steps 1910 through 1960 at a predetermined frequency.

In some embodiments, the computing device displays the criticality scores in a time chart, so that the network security situation can be observed in real time.

At least some aspects of the present disclosure will now be described with reference to the following numbered clauses.

Clause 1. A computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score of the first host based on the first type information and the first scaling factor; calculating, by the computing device, a second criticality score of the second host based on the second type information and the second scaling factor; and facilitating, by the computing device, to apply a security patch on the first host prior to the second host when the first criticality score is higher than the second criticality score.

Clause 2. The method of clause 1, where the first or second device category is one of workstation, router, server, printer, camera or a combination thereof.

Clause 3. The method of clause 1, where the first or second type information include a criticality range with a minimum and maximum value for each device category.

Clause 4. The method of clause 3, where the minimum value for the device category of the first or second host is determined by a machine learning model.

Clause 5. The method of clause 3, where the first criticality score is a product of multiplying the first type information and the first scaling factor, and the second criticality score is a product of multiplying the second type information and the second scaling factor.

Clause 6. The method of clause 5, where calculating the first or second criticality score includes using, as a multiplication factor, the minimum value for the device category of the first or second type information.

Clause 7. The method of clause 1, where the functionality of the first or second host is identified based on a network map.

Clause 8. The method of clause 1, where the functionality of the first or second host is inferred by network traffic and interactions.

Clause 9. The method of clause 1, where the use case of the first or second host is determined by a location of the respective host.

Clause 10. The method of clause 1, where the network scanning and calculating the criticality scores are conducted repeatedly at a predetermined frequency.

Clause 11. A computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score of the first host by multiplying the first type information and the first scaling factor; calculating, by the computing device, a second criticality score of the second host by multiplying the second type information and the second scaling factor; and facilitating, by the computing device, to apply a security patch on the first host prior to the second host when the first criticality score is higher than the second criticality score.

Clause 12. The method of clause 11, where the first or second device category is one of workstation, router, server, printer, camera or a combination thereof.

Clause 13. The method of clause 11, where the first or second type information include a criticality range with a minimum and maximum value for each device category.

Clause 14. The method of clause 13, where the minimum value for the device category of the first or second host is determined by a machine learning model.

Clause 15. The method of clause 13, where calculating the first or second criticality score includes using, as a multiplication factor, the minimum value for the device category of the first or second type information.

Clause 16. The method of clause 11, where the functionality of the first or second host is identified based on a network map.

Clause 17. The method of clause 11, where the functionality of the first or second host is inferred by network traffic and interactions.

Clause 18. The method of clause 11, where the use case of the first or second host is determined by a location of the first or second host.

Clause 19. The method of clause 11, where the network scanning and calculating the criticality scores are conducted repeatedly at a predetermined frequency.

Clause 20. A system, including: one or more processors; and a memory in communication with the one or more processors and storing instructions that, when executed by the one or more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first and second scaling factor of the first and second host, respectively, where the first or second scaling factor is based at least in part on: a number of services running on the respective host, a functionality of the respective host, and a use case of the respective host; calculate a first criticality score of the first host based on the first type information and the first scaling factor; calculate a second criticality score of the second host based on the second type information and the second scaling factor; and facilitate to apply a security patch on the first host prior to the second host when the first criticality score is higher than the second criticality score.

Clause 21. The system of clause 20, where the first or second device category is one of workstation, router, server, printer, camera or a combination thereof.

Clause 22. The system of clause 20, where the first or second type information include a criticality range with a minimum and maximum value for each device category.

Clause 23. The system of clause 22, where the first criticality score is a product of multiplying the first type information and the first scaling factor, and the second criticality score is a product of multiplying the second type information and the second scaling factor.

Clause 24. The system of clause 23, where calculating the first or second criticality score includes using, as a multiplication factor, the minimum value for the device category of the first or second type information.

Clause 25. The system of clause 20, where the functionality of the first or second host is identified based on a network map.

Clause 26. The system of clause 20, where the functionality of the first or second host is inferred by network traffic and interactions.

Clause 27. The system of clause 20, where the use case of the first or second host is determined by a location of the respective host.

Clause 28. A system, including: one or more processors; and a memory in communication with the one or more processors and storing instructions that, when executed by the one or more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first scaling factor of the first host, and a second scaling factor of the second host, where the first or second scaling factor is based at least in part on: a number of services running on the respective host, a functionality of the respective host, and a use case of the respective host; calculate a first criticality score of the first host by multiplying the first type information and the first scaling factor; calculate a second criticality score of the second host by multiplying the second type information and the second scaling factor; and facilitate to apply a security patch on the first host prior to the second host when the first criticality score is higher than the second criticality score.

Clause 29. The system of clause 28, where the first or second device category is one of workstation, router, server, printer, camera or a combination thereof.

Clause 30. The system of clause 28, where the first or second type information include a criticality range with a minimum and maximum value for each device category; and the calculating the first or second criticality score includes using, as a multiplication factor, the minimum value for the device category of the first or second type information.

Figure 20:
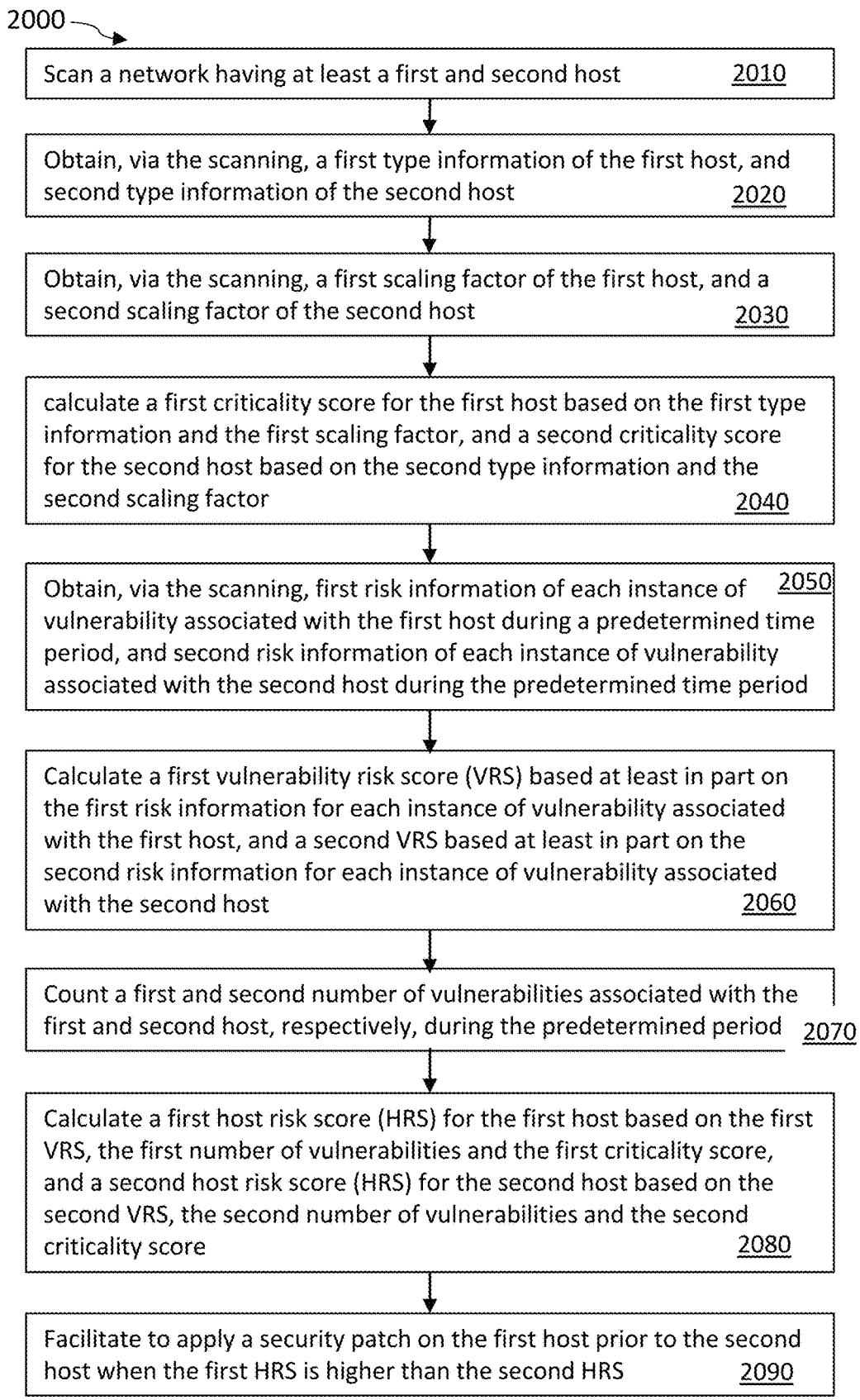
FIG. 20 is a flowchart illustrating a network security management process in accordance with one or more embodiments of the present disclosure.

FIG. 20 is a flowchart illustrating a network security management process 2000 in accordance with one or more embodiments of the present disclosure. The steps shown in FIG. 20 can be performed by any suitable computer-executable code and/or computing system, including system 100 shown in FIG. 1, and/or variations or combinations of one or more of the same. In one example, each of the steps shown in FIG. 20 can represent an algorithm whose structure includes and/or is represented by multiple sub-steps, examples of which will be provided in greater detail below.

In step 2010, a computing device scans a network having at least a first and second host.

In step 2020, the computing device obtains, via the scanning, a first type information of the first host, and second type information of the second host. The first type information includes a first device category associated with the first host. The second type information includes a second device category associated with the second host.

In step 2030, the computing device obtains, via the scanning, a first scaling factor of the first host, and a second scaling factor of the second host, where the first or second scaling factor is based at least in part on:

a number of services running on the respective host, a functionality of the respective host, and a use case of the respective host.

In step 2040, the computing device calculates a first criticality score for the first host based on the first type information and the first scaling factor, and a second criticality score for the second host based on the second type information and the second scaling factor.

In step 2050, the computing device obtains, via the scanning, first risk information of each instance of vulnerability associated with the first host during a predetermined time period, and second risk information of each instance of vulnerability associated with the second host during the predetermined time period, where the first risk information includes a common vulnerability scoring system (CVSS) score, an exploitability measurement and a measurement parameter of identified link to one or more bad actors associated with the first host, and the second risk information includes a common vulnerability scoring system (CVSS) score, an exploitability measurement and a measurement parameter of identified link to one or more bad actors associated with the second host.

In step 2060, the computing devices calculates a first vulnerability risk score (VRS) based at least in part on the first risk information for each instance of vulnerability associated with the first host, and a second VRS based at least in part on the second risk information for each instance of vulnerability associated with the second host.

In step 2070, the computing device counts a first and second number of vulnerabilities associated with the first and second host, respectively, during the predetermined period.

In step 2080, the computing device calculates a first host risk score (HRS) for the first host based on the first VRS, the first number of vulnerabilities and the first criticality score, and a second host risk score (HRS) for the second host based on the second VRS, the second number of vulnerabilities and the second criticality score.

In step 2090, the computing device facilitates to apply a security patch on the first host prior to the second host when the first HRS is higher than the second HRS.

Figure 21:
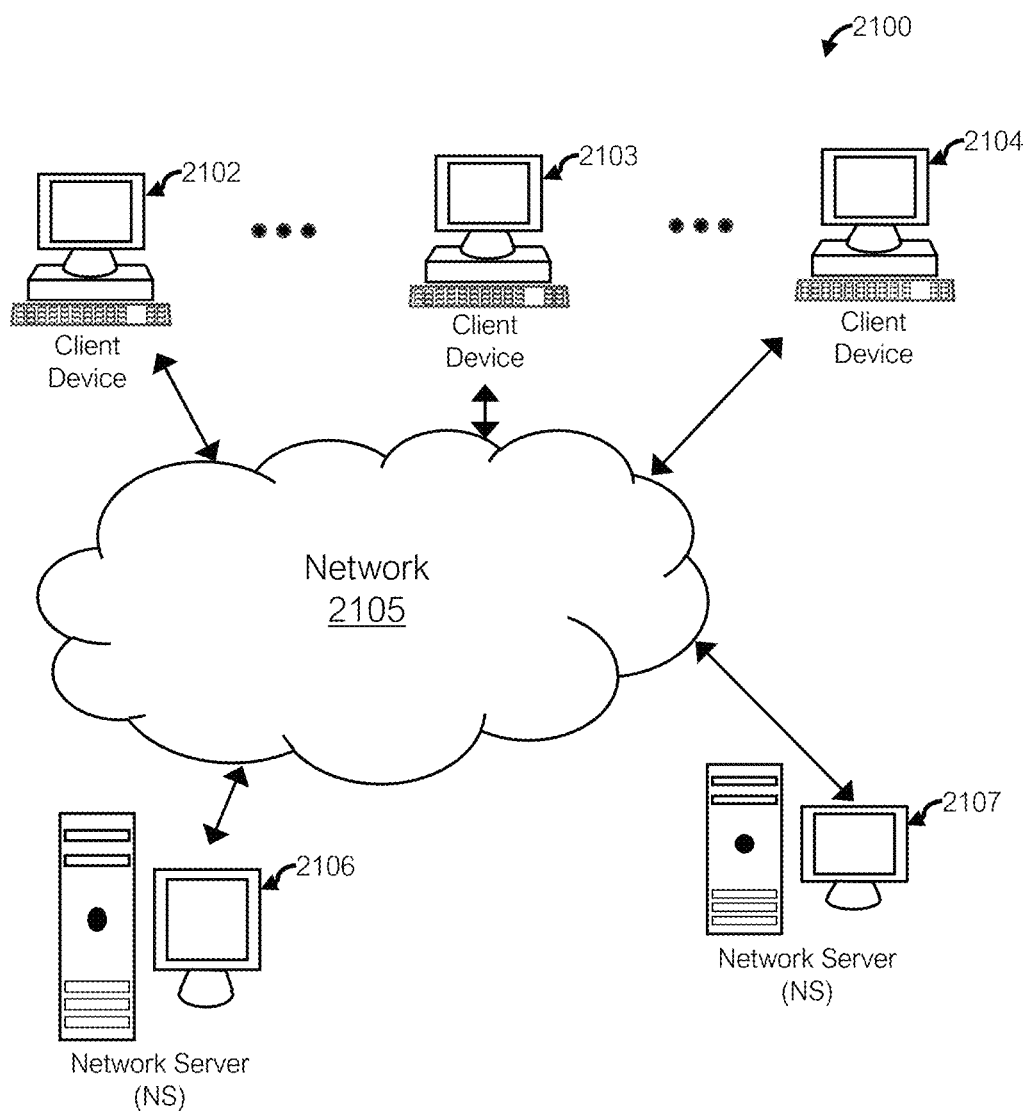
FIG. 21 depicts a block diagram of an exemplary computer-based system and platform in accordance with one or more embodiments of the present disclosure.

FIG. 21 depicts a block diagram of an exemplary computer-based system and platform 2100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 2100 may be configured to generate a plurality of unique identification codes for the plurality of devices, compare the plurality of unique identification codes, and calculate a similarity score based on the comparison of the plurality of unique identification codes, as detailed herein. In some embodiments, the exemplary computer-based system and platform 2100 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 21, client device 2102, client device 2103 through client device 2104 (e.g., clients) of the exemplary computer-based system and platform 2100 may include virtually any computing device capable of receiving and sending a message over a network (e.g., cloud network), such as network 2105, to and from another computing device, such as servers 2106 and 2107, each other, and the like. In some embodiments, the client devices 2102 through 2104 may be personal computers, multiprocessor systems, microprocessor-based or programmable consumer electronics, network PCs, and the like. In some embodiments, one or more client devices within client devices 2102 through 2104 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 2102 through 2104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 2102 through 2104 may run one or more applications, such as Internet browsers, mobile applications, voice calls, video games, videoconferencing, and email, among others. In some embodiments, one or more client devices within client devices 2102 through 2104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 2102 through 2104 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advanced user, standard user. In some embodiments, one or more client devices within client devices 2102 through 2104 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 2105 may provide network access, data transport and/or other services to any computing device coupled to it. In some embodiments, the exemplary network 2105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 2105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 2105 may include and implement, as an alternative or in conjunction with one or more of the above, a WiMAX architecture defined by the WiMAX forum. In some embodiments and, optionally, in combination of any embodiment described above or below, the exemplary network 2105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 2105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 2105 may also include mass storage, such as network attached storage (NAS), a storage area network (SAN), a content delivery network (CDN) or other forms of computer or machine-readable media.

In some embodiments, the exemplary server 2106 or the exemplary server 2107 may be a web server (or a series of servers) running a network operating system, examples of which may include but are not limited to Apache on Linux or Microsoft IIS (Internet Information Services). In some embodiments, the exemplary server 2106 or the exemplary server 2107 may be used for and/or provide cloud and/or network computing. Although not shown in FIG. 21, in some embodiments, the exemplary server 2106 or the exemplary server 2107 may have connections to external systems like email, SMS messaging, text messaging, ad content providers, etc. Any of the features of the exemplary server 2106 may be also implemented in the exemplary server 2107 and vice versa.

In some embodiments, one or more of the exemplary servers 2106 and 2107 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 2102 through 2104.

In some embodiments and, optionally, in combination of any embodiment described above or below, for example, one or more exemplary computing client devices 2102 through 2104, the exemplary server 2106, and/or the exemplary server 2107 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 22:
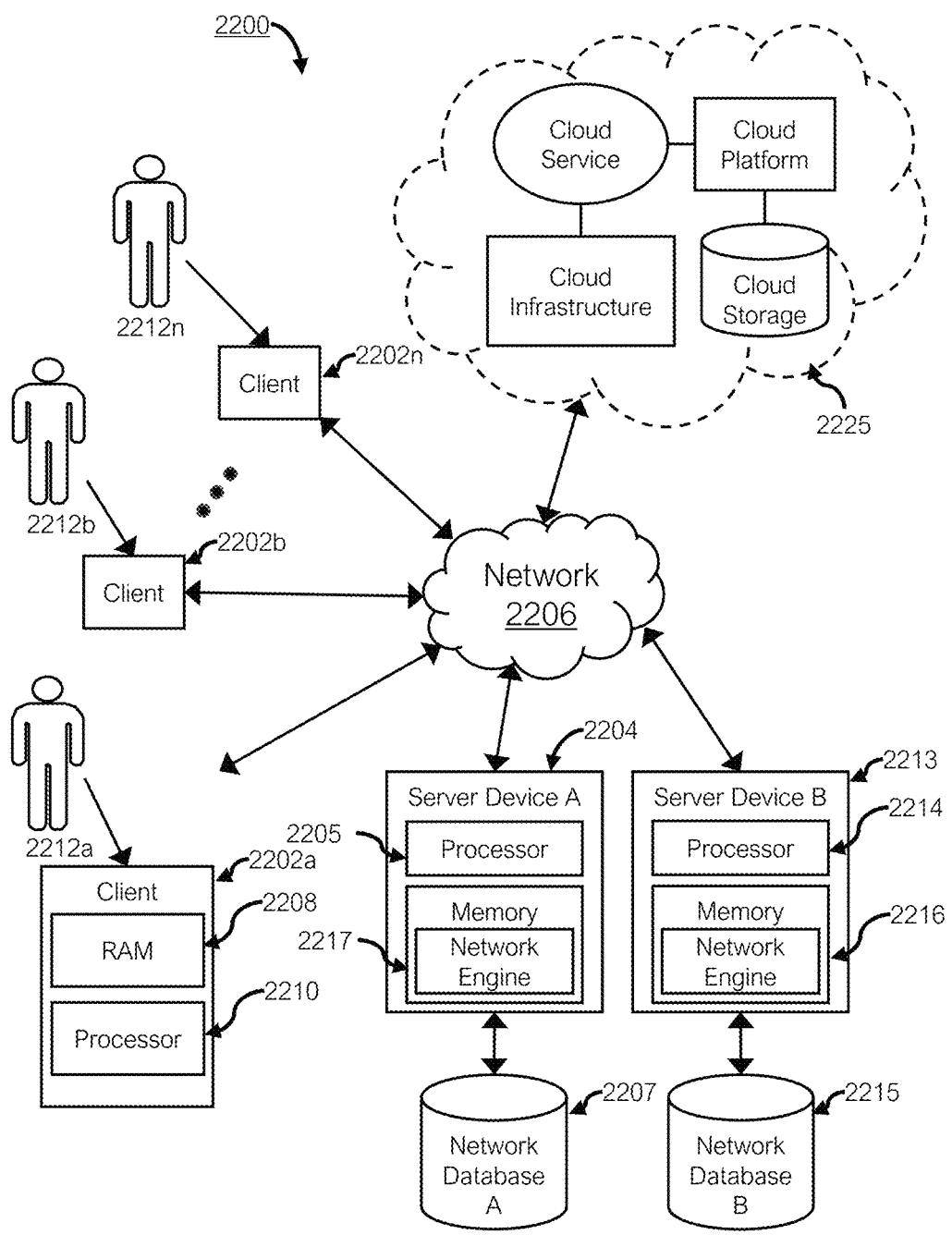
FIG. 22 depicts a block diagram of another exemplary computer-based system and platform 900 in accordance with one or more embodiments of the present disclosure.

FIG. 22 depicts a block diagram of another exemplary computer-based system and platform 2200 in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the client device 2202a, client device 2202b through client device 2202n shown each at least includes a computer-readable medium, such as a random-access memory (RAM) 2208 coupled to a processor 2210 or FLASH memory. In some embodiments, the processor 2210 may execute computer-executable program instructions stored in memory 2208. In some embodiments, the processor 2210 may include a microprocessor, an ASIC, and/or a state machine. In some embodiments, the processor 2210 may include, or may be in communication with, media, for example computer-readable media, which stores instructions that, when executed by the processor 2210, may cause the processor 2210 to perform one or more steps described herein. In some embodiments, examples of computer-readable media may include, but are not limited to, an electronic, optical, magnetic, or other storage or transmission device capable of providing a processor, such as the processor 2210 of client device 2202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and etc.

In some embodiments, client devices 2202a through 2202n may also include a number of external or internal devices such as a mouse, a CD-ROM, DVD, a physical or virtual keyboard, a display, or other input or output devices. In some embodiments, examples of client devices 2202a through 2202n (e.g., clients) may be any type of processor-based platforms that are connected to a network 2206 such as, without limitation, personal computers, digital assistants, personal digital assistants, smart phones, pagers, digital tablets, laptop computers, Internet appliances, and other processor-based devices. In some embodiments, client devices 2202a through 2202n may be specifically programmed with one or more application programs in accordance with one or more principles/methodologies detailed herein. In some embodiments, client devices 2202a through 2202n may operate on any operating system capable of supporting a browser or browser-enabled application, such as Microsoft™, Windows™, and/or Linux. In some embodiments, client devices 2202a through 2202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 2202a through 2202n, user 2212a, user 2212b through user 2212n, may communicate over the exemplary network 2206 with each other and/or with other systems and/or devices coupled to the network 2206. As shown in FIG. 22, exemplary server devices 2204 and 2213 may include processor 2205 and processor 2214, respectively, as well as memory 2217 and memory 2216, respectively. In some embodiments, the server devices 2204 and 2213 may be also coupled to the network 2206. In some embodiments, one or more client devices 2202a through 2202n may be mobile clients.

In some embodiments, at least one database of exemplary databases 2207 and 2215 may be any type of database, including a database managed by a database management system (DBMS). In some embodiments, an exemplary trained autoencoder 122 may be specifically programmed as an engine that controls organization, storage, management, and/or retrieval of data in the respective database. In some embodiments, the exemplary trained autoencoder 122 may be specifically programmed to provide the ability to generate a plurality of unique identification codes for the plurality of devices, compare the plurality of unique identification codes, and calculate a similarity score based on the comparison of the plurality of unique identification codes. In some embodiments, the exemplary trained autoencoder 122 may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary trained autoencoder 122 of the present disclosure may be specifically configured to operate in a cloud computing/architecture 2225 such as, but not limiting to: infrastructure a service (IaaS), platform as a service (PaaS), and/or software as a service (SaaS) using a web browser, mobile app, thin client, terminal emulator, or other endpoints.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

At least some aspects of the present disclosure will now be described with reference to the following numbered clauses.

Clause 1. A computer-implemented method including:
scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score for the first host based on the first type information and the first scaling factor, and a second criticality score for the second host based on the second type information and the second scaling factor; obtaining, by the computing device via the scanning, first risk information of each instance of vulnerability associated with the first host during a predetermined time period, and second risk information of each instance of vulnerability associated with the second host during the predetermined time period, where the first risk information includes a common vulnerability scoring system (CVSS) score, an exploitability measurement and a measurement parameter of identified link to one or more bad actors associated with the first host, and the second risk information includes a common vulnerability scoring system (CVSS) score, an exploitability measurement and a measurement parameter of identified link to one or more bad actors associated with the second host; calculating, by the computing device, a first vulnerability risk score (VRS) based at least in part on the first risk information for each instance of vulnerability associated with the first host, and a second VRS based at least in part on the second risk information for each instance of vulnerability associated with the second host; counting, by the computing device, a first and second number of vulnerabilities associated with the first and second host, respectively, during the predetermined period; calculating, by the computing device, a first host risk score (HRS) for the first host based on the first VRS, the first number of vulnerabilities and the first criticality score, and a second host risk score (HRS) for the second host based on the second VRS, the second number of vulnerabilities and the second criticality score; facilitating, by the computing device, to apply a security patch on the first host prior to the second host when the first HRS is higher than the second HRS.

Clause 2. The method of clause 1, wherein the first or second device category is one of workstation, router, server, printer, camera or a combination thereof.

Clause 3. The method of clause 1, where the first type information includes a first criticality range with a first minimum and first maximum value for the first device category, and a second type information includes a second criticality range with a second minimum and second maximum value for the second device category.

Clause 4. The method of clause 3, where the first minimum value and the second minimum value are obtained by a machine learning model.

Clause 5. The method of clause 4, where calculating the first criticality score includes multiplying the first type information and the first scaling factor, and calculating the second criticality score includes multiplying the second type information and the second scaling factor.

Clause 6. The method of clause 5, where calculating the first criticality score includes using the first minimum value as a multiplication factor; and calculating the second criticality score includes using the second minimum value as a multiplication factor.

Clause 7. The method of clause 1, where obtaining the first or second type information includes: comparing the first or second type information to type information of a plurality of hosts within the network to generate a confidence score for the first or second host; and grouping the type information of the plurality of hosts based on the confidence score meeting a predetermined threshold.

Clause 8. The method of clause 1, where the functionality of the first or second host is identified based at least in part on a network map.

Clause 9. The method of clause 1, where the functionality of the first or second host is inferred by network traffic and interactions.

Clause 10. The method of clause 1, where the use case of the first or second host is determined at least in part by a location of the respective host.

Clause 11. The method of clause 1, where calculating the first VRS includes: calculating, by the computing device, a first vulnerability measure for each instance of the vulnerability based on the associated first risk information to generate a plurality of first vulnerability measures; selecting, by the computing device, one of the plurality of first vulnerability measures to be the first VRS based on a predetermined criterion; and where calculating the second VRS includes: calculating, by the computing device, a second vulnerability measure for each instance of the vulnerability based on the associated second risk information to generate a plurality of second vulnerability measures; selecting, by the computing device, one of the second plurality of vulnerability measures to be the second VRS based on the predetermined criterion.

Clause 12. The method of clause 11, where the first or second vulnerability measure has a linear relationship with the respective CVSS score, the respective exploitability measurement and the respective measurement parameter of identified link to one or more bad actors.

Clause 13. The method of clause 11, where the predetermined criterion is to select the first or second VRS with a highest value.

Clause 14. The method of clause 1, where the first HRS has a linear relationship with the first VRS, the first number of vulnerabilities and the first criticality score; and the second HRS has the linear relationship with the second VRS, the second number of vulnerabilities and the second criticality score.

Clause 15. The method of clause 1, further including obtaining, by the computing device, network traffic information at the first and second host during the predetermined period and display the network traffic information along with the first and second HRS and the first and second criticality score.

Clause 16. The method of clause 1, further including repeatedly scanning the network to calculate at least the first HRS for the first host.

Clause 17. A computer-implemented method including: scanning, by a computing device, a network having at least a first and second host; obtaining, by the computing device via the scanning, a first type information of the first host, and second type information of the second host, the first type information including a first device category associated with the first host, the second type information including a second device category associated with the second host; obtaining, by the computing device via the scanning, a first scaling factor of the first host, and a second scaling factor of the second host, where the first or second scaling factor is based at least in part on: a number of services running on the respective host, a functionality of the respective host, and a use case of the respective host; calculating, by the computing device, a first criticality score for the first host by multiplying the first type information and the first scaling factor, and a second criticality score for the second host by multiplying the second type information and the second scaling factor; obtaining, by the computing device via the scanning, first risk information of each instance of vulnerability associated with the first host during a predetermined time period, and second risk information of each instance of vulnerability associated with the second host during the predetermined time period, where the first risk information has a linear relationship with a common vulnerability scoring system (CVSS) score, an exploitability measurement and a measurement parameter of identified link to one or more bad actors associated with the first host, and the second risk information has a linear relationship with a common vulnerability scoring system (CVSS) score, an exploitability measurement and a measurement parameter of identified link to one or more bad actors associated with the second host; calculating, by the computing device, a first vulnerability measure for each instance of the vulnerability based on the associated first risk information to generate a plurality of first vulnerability measures, and a second vulnerability measure for each instance of the vulnerability based on the associated second risk information to generate a plurality of second vulnerability measures; selecting, by the computing device, one of the plurality of first vulnerability measures to be a first vulnerability risk score (VRS) based on a predetermined criterion, and one of the plurality of second vulnerability measures to be the second VRS based on the predetermined criterion; counting, by the computing device, a first and second number of vulnerabilities associated with the first and second host, respectively, during a predetermined period; calculating, by the computing device, a first host risk score (HRS) for the first host based on the first VRS, the first number of vulnerabilities and the first criticality score, and a second host risk score (HRS) for the second host based on the second VRS, the second number of vulnerabilities and the second criticality score; and facilitating, by the computing device, to apply a security patch on the first host prior to the second host when the first HRS is higher than the second HRS.

Clause 18. The method of clause 17, where the device category is one of workstation, router, server, printer, camera or a combination thereof, and has a criticality range with a minimum and maximum value.

Clause 19. The method of clause 17, where calculating the first criticality score includes using, as a multiplication factor, a first minimum value for the first device category of the first type information; and calculating the second criticality score includes using, as a multiplication factor, a second minimum value for the second device category of the second type information.

Clause 20. The method of clause 17, where the functionality of the first or second host is identified based on a network map or inferred by network traffic and interactions.

Clause 21. The method of clause 17, where the use case of the first or second host is determined by a location of the respective host.

Clause 22. The method of clause 17, where the first or second risk information includes a common vulnerability scoring system (CVSS) score, an exploitability measurement and a measurement parameter of identified link to one or more bad actors of the respective host.

Clause 23. The method of clause 22, where the first or second vulnerability measure has a linear relationship with the respective CVSS score, the respective exploitability measurement and the respective measurement parameter of identified link to one or more bad actors.

Clause 24. The method of clause 17, where the predetermined criterion is to select the first or second VRS with a highest value.

Clause 25. The method of clause 17, where the first HRS has a linear relationship with the first VRS, the first number of vulnerabilities and the first criticality score; and the second HRS has the linear relationship with the second VRS, the second number of vulnerabilities and the second criticality score.

Clause 26. The method of clause 17, further including obtaining, by the computing device, network traffic information at the first and second host during the predetermined period and display the network traffic information along with the first and second HRS and the first and second criticality score.

Clause 27. The method of clause 17, further including repeatedly scanning the network to calculate at least the first HRS for the first host.

Clause 28. A system, including: one or more processors; and a memory in communication with the one or more processors and storing instructions that, when executed by the one of more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first scaling factor of the first host, and a second scaling factor of the second host, where the first or second scaling factor is based at least in part on: a number of services running on the respective host, a functionality of the respective host, and a use case of the respective host; calculate a first criticality score for the first host based on the first type information and the first scaling factor, and a second criticality score for the second host based on the second type information and the second scaling factor; obtain, via the scanning, first risk information of each instance of vulnerability associated with the first host during a predetermined time period, and second risk information of each instance of vulnerability associated with the second host during the predetermined time period, where the first risk information includes a common vulnerability scoring system (CVSS) score, an exploitability measurement and a measurement parameter of identified link to one or more bad actors associated with the first host, and the second risk information includes a common vulnerability scoring system (CVSS) score, an exploitability measurement and a measurement parameter of identified link to one or more bad actors associated with the second host; calculate a first vulnerability risk score (VRS) based at least in part on the first risk information for each instance of vulnerability associated with the first host, and a second VRS based at least in part on the second risk information for each instance of vulnerability associated with the second host; count a first and second number of vulnerabilities associated with the first and second host, respectively, during the predetermined period; calculate a first host risk score (HRS) for the first host based on the first VRS, the first number of vulnerabilities and the first criticality score, and a second host risk score (HRS) for the second host based on the second VRS, the second number of vulnerabilities and the second criticality score; facilitate to apply a security patch on the first host prior to the second host when the first HRS is higher than the second HRS.

Clause 29. A system, including: one or more processors; and a memory in communication with the one or more processors and storing instructions that, when executed by the one of more processors, cause the one or more processors to: scan a network having at least a first and second host; obtain, via the scanning, a first type information of the first host, and second type information of the second host, the first type information including a first device category associated with the first host, the second type information including a second device category associated with the second host; obtain, via the scanning, a first scaling factor of the first host, and a second scaling factor of the second host, where the first or second scaling factor is based at least in part on: a number of services running on the respective host, a functionality of the respective host, and a use case of the respective host; calculate a first criticality score for the first host by multiplying the first type information and the first scaling factor, and a second criticality score for the second host by multiplying the second type information and the second scaling factor; obtain, via the scanning, first risk information of each instance of vulnerability associated with the first host during a predetermined time period, and second risk information of each instance of vulnerability associated with the second host during the predetermined time period, where the first risk information has a linear relationship with a common vulnerability scoring system (CVSS) score, an exploitability measurement and a measurement parameter of identified link to one or more bad actors associated with the first host, and the second risk information has a linear relationship with a common vulnerability scoring system (CVSS) score, an exploitability measurement and a measurement parameter of identified link to one or more bad actors associated with the second host; calculate a first vulnerability measure for each instance of the vulnerability based on the associated first risk information to generate a plurality of first vulnerability measures, and a second vulnerability measure for each instance of the vulnerability based on the associated second risk information to generate a plurality of second vulnerability measures; select one of the plurality of first vulnerability measures to be a first vulnerability risk score (VRS) based on a predetermined criterion, and one of the plurality of second vulnerability measures to be the second VRS based on the predetermined criterion; count a first and second number of vulnerabilities associated with the first and second host, respectively, during a predetermined period; calculate a first host risk score (HRS) for the first host based on the first VRS, the first number of vulnerabilities and the first criticality score, and a second host risk score (HRS) for the second host based on the second VRS, the second number of vulnerabilities and the second criticality score; and facilitate to apply a security patch on the first host prior to the second host when the first HRS is higher than the second HRS.

Publications cited throughout this document are hereby incorporated by reference in their entirety. While one or more embodiments of the present disclosure have been described, it may be understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A computer-implemented method comprising:
    obtaining, by a computing device, a first type information and a first scaling factor of a first host, the first host being in a network,
    obtaining, by the computing device, a second type information and a second scaling factor of a second host, the second host being in the network,
        wherein the first scaling factor or the second scaling factor is based at least in part on at least one of:
            a number of services running on the respective host,
            a functionality of the respective host, or
            a use case of the respective host;
    calculating, by the computing device, a first criticality score for the first host based on the first type information and the first scaling factor;
    calculating, by the computing device, a second criticality score for the second host based on the second type information and the second scaling factor;
    calculating, by the computing device, for the first host, a first vulnerability risk score (VRS) based at least in part on first risk information for each instance of vulnerability associated with the first host during a predetermined time period;
    calculating, by the computing device, for the second host, a second VRS based at least in part on second risk information for each instance of vulnerability associated with the second host during the predetermined time period;
    calculating, by the computing device, a first host risk score (HRS) for the first host based at least in part on:
        the first VRS,
        a first number of vulnerabilities associated with the first host and
        the first criticality score, and
    calculating, by the computing device, a second host risk score (HRS) for the second host based at least in part on:
        the second VRS,
        a second number of vulnerabilities associated with the second host and
        the second criticality score;
    facilitating, by the computing device, to apply a security patch on the first host prior to the second host when the first HRS is higher than the second HRS.

2. The method of claim 1, wherein the first type information comprises a first device category and the second type information comprises a second device category, wherein the first or second device category is one of workstation, router, server, printer, camera or a combination thereof.

3. The method of claim 2, wherein the first type information comprises a first criticality range with a first minimum and first maximum value for the first device category, and a second type information comprises a second criticality range with a second minimum and second maximum value for the second device category.

4. The method of claim 3, wherein the first minimum value and the second minimum value are obtained by a machine learning model.

5. The method of claim 4, wherein calculating the first criticality score comprises multiplying the first type information and the first scaling factor, and calculating the second criticality score comprises multiplying the second type information and the second scaling factor.

6. The method of claim 5, wherein calculating the first criticality score comprises using the first minimum value as a multiplication factor; and calculating the second criticality score comprises using the second minimum value as a multiplication factor.

7. The method of claim 1, wherein obtaining the first type information or the second type information comprises:
comparing the first type information or the second type information to type information of a plurality of hosts within the network to generate a confidence score for the first host or the second host; and
grouping the type information of the plurality of hosts based on the confidence score meeting a predetermined threshold.

8. The method of claim 1, wherein calculating the first VRS comprises:
calculating, by the computing device, a first vulnerability measure for each instance of the vulnerability based on the associated first risk information to generate a plurality of first vulnerability measures, and
selecting, by the computing device, one of the plurality of first vulnerability measures to be the first VRS based on a predetermined criterion; and
wherein calculating the second VRS comprises:
calculating, by the computing device, a second vulnerability measure for each instance of the vulnerability based on the associated second risk information to generate a plurality of second vulnerability measures, and
selecting, by the computing device, one of the second plurality of vulnerability measures to be the second VRS based on the predetermined criterion.

9. The method of claim 8, wherein the predetermined criterion is determined by selecting the first VRS or the second VRS with a highest value.

10. The method of claim 8, wherein the first risk information comprises a common vulnerability scoring system (CVSS) score, an exploitability measurement and a measurement parameter of identified link to one or more bad actors associated with the first host; and the second risk information comprises a common vulnerability scoring system (CVSS) score, an exploitability measurement and a measurement parameter of identified link to one or more bad actors associated with the second host.

11. The method of claim 10, wherein the first vulnerability measure or the second vulnerability measure has a linear relationship with the respective CVSS score, the respective exploitability measurement and the respective measurement parameter of identified link to one or more bad actors.

12. The method of claim 1, wherein the functionality of the first host or the second host is identified based at least in part on a network map.

13. The method of claim 1, wherein the functionality of the first host or the second host is inferred by network traffic and interactions.

14. The method of claim 1, wherein the use case of the first host or the second host is determined at least in part by a location of the respective host.

15. The method of claim 1, wherein the first HRS has a linear relationship with the first VRS, the first number of vulnerabilities and the first criticality score; and the second HRS has the linear relationship with the second VRS, the second number of vulnerabilities and the second criticality score.

16. The method of claim 1, further comprising obtaining, by the computing device, network traffic information at the first and second host during the predetermined period and display the network traffic information along with the first and second HRS and the first and second criticality score.

17. The method of claim 1, further comprising repeatedly scanning the network to calculate at least the first HRS for the first host.

18. A system, comprising:
one or more processors; and
a memory in communication with the one or more processors and storing instructions that, when executed by the one of more processors, cause the one or more processors to:
obtain a first type information and a first scaling factor of a first host, and second type information and a second scaling factor of the second host, the first and second host being in a network, the first scaling factor or the second scaling factor being based at least in part on at least one of:
a number of services running on the respective host,
a functionality of the respective host, or
a use case of the respective host;
calculate a first criticality score for the first host based on the first type information and the first scaling factor, and a second criticality score for the second host based on the second type information and the second scaling factor;
calculate a first vulnerability risk score (VRS) based at least in part on the first risk information for each instance of vulnerability associated with the first host during a predetermined time period, and a second VRS based at least in part on the second risk information for each instance of vulnerability associated with the second host during the predetermined time period; count a first number of vulnerabilities associated with the first host and second number of vulnerabilities associated with the second host during the predetermined period;
calculate a first host risk score (HRS) for the first host based on the first VRS, the first number of vulnerabilities and the first criticality score, and a second host risk score (HRS) for the second host based on the second VRS, the second number of vulnerabilities and the second criticality score;
facilitate to apply a security patch on the first host prior to the second host when the first HRS is higher than the second HRS.

19. The system of claim 18, wherein the one or more processors calculating the first VRS comprises:
calculating a first vulnerability measure for each instance of the vulnerability based on the associated first risk information to generate a plurality of first vulnerability measures, and selecting one of the plurality of first vulnerability measures to be the first VRS based on a predetermined criterion; and
wherein the one or more processors calculating the second VRS comprises:
calculating a second vulnerability measure for each instance of the vulnerability based on the associated second risk information to generate a plurality of second vulnerability measures, and
selecting one of the second plurality of vulnerability measures to be the second VRS based on the predetermined criterion.

20. The system of claim 18, wherein the first risk information comprises a common vulnerability scoring system (CVSS) score, an exploitability measurement and a measurement parameter of identified link to one or more bad actors associated with the first host; and the second risk information comprises a common vulnerability scoring system (CVSS) score, an exploitability measurement and a measurement parameter of identified link to one or more bad actors associated with the second host.

21. A computer-implemented method comprising:
obtaining, by a computing device, a type information and a scaling factor of a host, the host being in a network wherein the scaling factor is based at least in part on at least one of:
- a number of services running on the host,
- a functionality of the host, or
- a use case of the host;

calculating, by the computing device, a criticality score for the host based on the type information and the scaling factor;

calculating, by the computing device, for the host, a vulnerability risk score (VRS) based at least in part on risk information for each instance of vulnerability associated with the host during a predetermined time period;

calculating, by the computing device, a host risk score (HRS) for the host based at least in part on:
- the VRS,
- a number of vulnerabilities associated with the host and the criticality score, and facilitating, by the computing device, to apply a security patch on the host prior to at least one other host when the HRS is higher than at least other HRS associated with the at least one other host.

* * * * *